US012403517B2

(12) United States Patent
Scherff

(10) Patent No.: US 12,403,517 B2
(45) Date of Patent: Sep. 2, 2025

(54) SPACER STRUCTURE, SANDWICH CONSTRUCTION WITH A SPACER STRUCTURE OF THIS KIND AND METHOD FOR PRODUCING A SPACER STRUCTURE OF THIS KIND

(71) Applicant: MATRIX Module GmbH, Dortmund (DE)

(72) Inventor: Maximilian Scherff, Dortmund (DE)

(73) Assignee: Matrix Module GmbH, Dortmund (DE)

( * ) Notice: Subject to any disclaimer, the term of this patent is extended or adjusted under 35 U.S.C. 154(b) by 435 days.

(21) Appl. No.: 17/995,346

(22) PCT Filed: Apr. 1, 2021

(86) PCT No.: PCT/DE2021/100320
§ 371 (c)(1),
(2) Date: Oct. 3, 2022

(87) PCT Pub. No.: WO2021/197549
PCT Pub. Date: Oct. 7, 2021

(65) Prior Publication Data
US 2023/0149999 A1   May 18, 2023

(30) Foreign Application Priority Data
Apr. 1, 2020   (DE) .................... 10 2020 109 118.4

(51) Int. Cl.
*B21D 13/08*   (2006.01)
*B21D 13/06*   (2006.01)
(Continued)

(52) U.S. Cl.
CPC ............. *B21D 13/06* (2013.01); *B21D 13/08* (2013.01); *B21D 13/10* (2013.01); *B21D 28/10* (2013.01);
(Continued)

(58) Field of Classification Search
CPC ........ B21D 13/06; B21D 13/08; B21D 13/10; B21D 28/10; B21D 47/00;
(Continued)

(56) References Cited

U.S. PATENT DOCUMENTS 3,111,204 A   11/1963   Phare
7,820,302 B2   10/2010   Krettenauer
(Continued)

FOREIGN PATENT DOCUMENTS

DE   102 59 307 A1   7/2004
EP   2 188 077 B1   7/2018
(Continued)

*Primary Examiner* — Michael E. La Villa
(74) *Attorney, Agent, or Firm* — Christensen, Fonder, Dardi & Herbert PLLC; John P. Fonder

(57) ABSTRACT

A spacer structure for a sandwich construction, formed from a material web which is provided with a plurality of cuts and which has a material web plane as a first plane, wherein, by forming the material web, at least one support platform is formed in portions which is spaced at a distance from the first plane and is arranged in a second plane. Spacing elements run along a direction of extent (E) from the first plane into the second plane in the transition zone from the first plane into the second plane and thus the spacing elements space the first plane apart from the support platform, the spacing elements having a twist about the direction of extent thereof along the direction of extent thereof (E), the twist being formed by the shaping of the material web being performed as bending.

20 Claims, 11 Drawing Sheets

(51) Int. Cl.
    *B21D 13/10*     (2006.01)
    *B21D 28/10*     (2006.01)
    *B21D 47/00*     (2006.01)
    *B29C 51/08*     (2006.01)
    *B32B 3/04*      (2006.01)
    *B32B 3/06*      (2006.01)
    *B32B 3/10*      (2006.01)
    *B32B 3/12*      (2006.01)
    *B32B 3/14*      (2006.01)
    *B32B 3/26*      (2006.01)
    *B32B 3/28*      (2006.01)
    *B32B 5/02*      (2006.01)
    *B32B 5/18*      (2006.01)
    *B32B 15/04*     (2006.01)
    *B32B 15/085*    (2006.01)
    *B32B 15/10*     (2006.01)
    *B32B 15/12*     (2006.01)
    *B32B 15/14*     (2006.01)
    *B32B 15/18*     (2006.01)
    *B32B 21/04*     (2006.01)
    *B32B 21/06*     (2006.01)
    *B32B 21/08*     (2006.01)
    *B32B 21/10*     (2006.01)
    *B32B 27/06*     (2006.01)
    *B32B 27/08*     (2006.01)
    *B32B 27/10*     (2006.01)
    *B32B 27/12*     (2006.01)
    *B32B 27/32*     (2006.01)
    *B32B 29/02*     (2006.01)
    *B32B 29/08*     (2006.01)
    *B29C 70/00*     (2006.01)
    *B65D 75/58*     (2006.01)

(52) U.S. Cl.
    CPC .............. *B21D 47/00* (2013.01); *B29C 51/08* (2013.01); *B32B 3/04* (2013.01); *B32B 3/06* (2013.01); *B32B 3/10* (2013.01); *B32B 3/12* (2013.01); *B32B 3/14* (2013.01); *B32B 3/266* (2013.01); *B32B 3/28* (2013.01); *B32B 5/02* (2013.01); *B32B 5/18* (2013.01); *B32B 15/043* (2013.01); *B32B 15/046* (2013.01); *B32B 15/085* (2013.01); *B32B 15/10* (2013.01); *B32B 15/12* (2013.01); *B32B 15/14* (2013.01); *B32B 15/18* (2013.01); *B32B 21/042* (2013.01); *B32B 21/047* (2013.01); *B32B 21/06* (2013.01); *B32B 21/08* (2013.01); *B32B 21/10* (2013.01); *B32B 27/065* (2013.01); *B32B 27/08* (2013.01); *B32B 27/10* (2013.01); *B32B 27/12* (2013.01); *B32B 27/32* (2013.01); *B32B 29/02* (2013.01); *B32B 29/08* (2013.01); *B29C 70/00* (2013.01); *B29C 2791/001* (2013.01); *B29C 2791/002* (2013.01); *B32B 2250/40* (2013.01); *B32B 2266/045* (2013.01); *B32B 2307/102* (2013.01); *B32B 2307/304* (2013.01); *B32B 2605/08* (2013.01); *B32B 2605/10* (2013.01); *B65D 75/5872* (2013.01); *Y10T 428/12306* (2015.01); *Y10T 428/1234* (2015.01); *Y10T 428/12361* (2015.01); *Y10T 428/12375* (2015.01); *Y10T 428/12382* (2015.01); *Y10T 428/1241* (2015.01); *Y10T 428/12417* (2015.01); *Y10T 428/24174* (2015.01); *Y10T 428/24182* (2015.01); *Y10T 428/24273* (2015.01); *Y10T 428/24298* (2015.01); *Y10T 428/24314* (2015.01); *Y10T 428/24669* (2015.01); *Y10T 428/24694* (2015.01); *Y10T 428/24727* (2015.01)

(58) Field of Classification Search
    CPC ........ B29C 2791/001; B29C 2791/002; B29C 70/00; B29C 51/08; B32B 3/12; B32B 3/28; B32B 3/04; B32B 3/06; B32B 3/10; B32B 3/14; B32B 3/266; B32B 5/02; B32B 5/18; B32B 15/043; B32B 15/046; B32B 15/085; B32B 15/10; B32B 15/12; B32B 15/14; B32B 15/18; B32B 21/042; B32B 21/047; B32B 21/06; B32B 21/08; B32B 21/10; B32B 27/065; B32B 27/08; B32B 27/10; B32B 27/12; B32B 27/32; B32B 29/02; B32B 29/08; B32B 2250/40; B32B 2266/045; B32B 2307/102; B32B 2307/304; B32B 2605/08; B32B 2605/10; B65D 75/5872; Y10T 428/24174; Y10T 428/24182; Y10T 428/24273; Y10T 428/24298; Y10T 428/24314; Y10T 428/24669; Y10T 428/24694; Y10T 428/24727; Y10T 428/12306; Y10T 428/1234; Y10T 428/12361; Y10T 428/12375; Y10T 428/12382; Y10T 428/1241; Y10T 428/12417
    See application file for complete search history.

(56) References Cited

U.S. PATENT DOCUMENTS

| | | |
|---|---|---|
| 2005/0167088 A1 | 8/2005 | Paulman |
| 2006/0246312 A1 | 11/2006 | Krettenauer |
| 2018/0309004 A1 | 10/2018 | Busse et al. |

FOREIGN PATENT DOCUMENTS

| | | |
|---|---|---|
| FR | 1 045 315 A | 11/1953 |
| WO | WO 2005/119769 A1 * | 12/2005 |

* cited by examiner

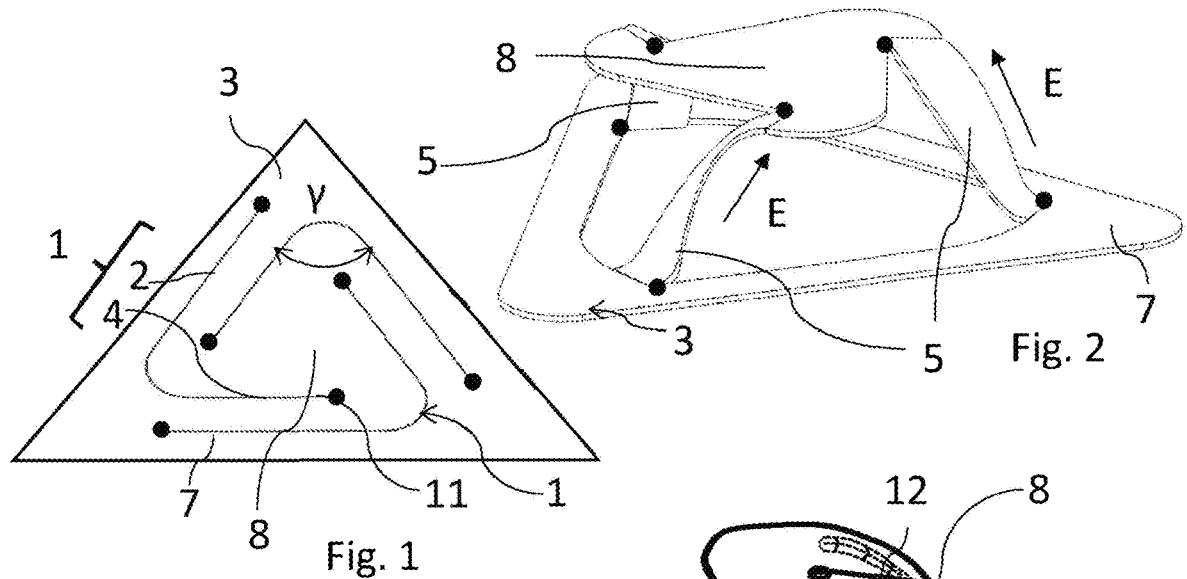
Fig. 1
Fig. 2
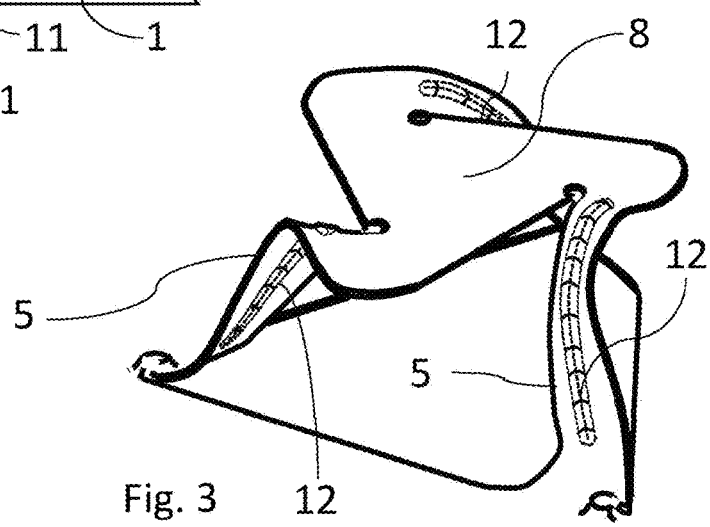
Fig. 3
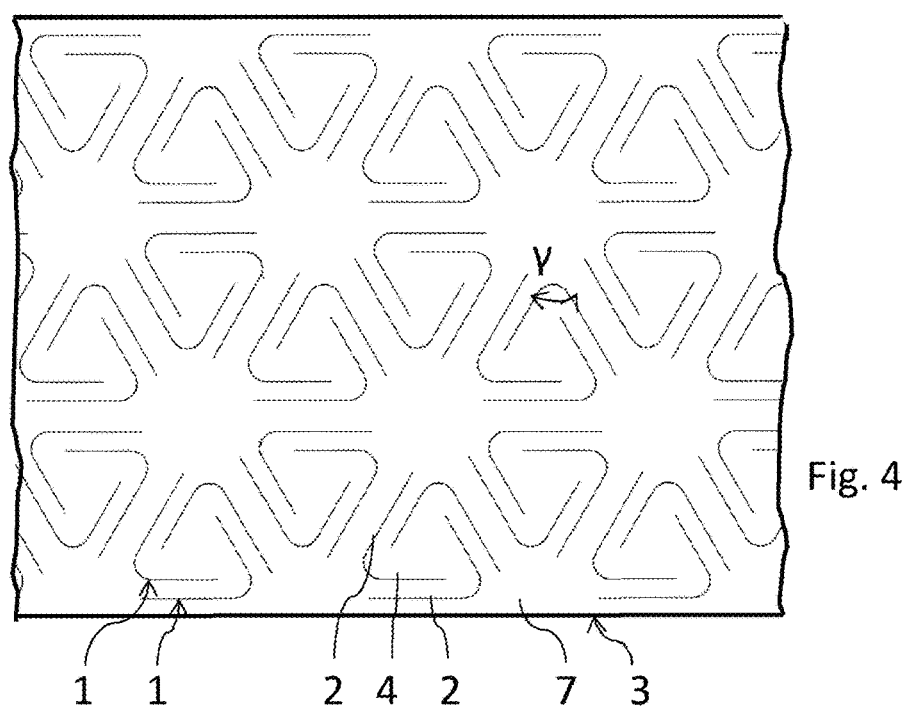
Fig. 4

SPACER STRUCTURE, SANDWICH CONSTRUCTION WITH A SPACER STRUCTURE OF THIS KIND AND METHOD FOR PRODUCING A SPACER STRUCTURE OF THIS KIND

RELATED APPLICATIONS

The present application is a National Phase entry of PCT Application No. PCT/DE2021/100320, filed Apr. 1, 2021, which claims priority to German Patent Application No. 10 2020 109 118.4, filed Apr. 1, 2020, the disclosures of which are hereby incorporated by reference herein in their entirety.

FIELD OF THE INVENTION

The invention relates to a spacer structure, to a sandwich construction having such a spacer structure, and to a method for producing such a spacer structure.

BACKGROUND OF THE INVENTION

A sandwich construction which has a spacer structure and is suitable for the use as structural component in vehicles of all types such as, for example, passenger motor vehicles, buses, railcars, and for the use in constructions in the building sector or for solely decorative purposes, is known from EP2188077B1, FR 1 045 315 and from U.S. Pat. No. 3,111,204. US 2006/0246312 and US 2018/0309004 show construction elements of similar structures from other fields of technology.

The general construction of a sandwich construction is usually in three parts. A core element is fastened to a lower cover layer, and an upper cover layer as a covering element is fixed to this core element from above. The core element herein ensures the structurally stabilized spacing between the lower cover layer and the upper cover layer in the form of the covering element. To this end, the core element has spacing elements. These spacing elements are portions of the core element that from the region of the lower cover layer extend toward and into the region of the upper cover layer and in this way enable the permanently stable spacing of the two cover layers.

In a variant of the sandwich construction, the spacing elements are preferably configured so as to be integral to one of the associated cover layers in that said spacing elements, for example as tabs, are bent out of the associated planar cover layer, or are deep drawn as bridges from the latter. In this way, said spacing elements run from the associated planar cover layer in the direction toward the adjacent cover layer to which said spacing elements are permanently fixed. As a result of spacing elements being bent out or deep drawn, openings are created in the cover layer that is configured so as to be integral to the spacing element. This cover layer is consequently no longer present as a continuously closed face in the sandwich construction. Furthermore, this sandwich construction is not configured in three parts but only in two parts. In this instance, the core element forms the spacing elements, and conjointly with other portions of the core element forms one of the two cover layers of the sandwich construction.

One disadvantage of a construction having spacing elements formed as deep-drawn bridges lies in that the production of such bridges is not possible with all materials. The forming process of deep drawing requires a sufficient elongation capability of the formed material. The material breaks once the critical elongation has been exceeded. The deep drawing of a spacing element produced from this material moreover limits any potential later deformation because the deformation reserve of the material has been partially consumed by the production method and the deep-drawn spacing elements under a great load, for example in the event of a crash, fail sooner than the same material without any prior deformation by a deep-drawing procedure.

Special materials which have a high tensile strength and/or can be hardened are less suitable for producing bridges by means of deep drawing. Even when suitable materials are used, the material thickness is reduced during deep drawing, and the stability of the spacing elements and consequently of the entire sandwich construction is reduced, which is undesirable.

When the spacing elements are configured as tabs, the material is indeed not elongated and thus reduced in terms of the material thickness thereof, but is only bent. However, depending on the specific material characteristics, such tabs, in terms of simple bending back of the tabs, are safe only to a very limited extent. When all tabs are identically aligned in spatial terms and shear forces, which are oriented counter to the bending direction of the tabs, arise between the two cover layers of the sandwich construction, the two cover layers are converged again while the tabs are being bent back. A sandwich construction formed with tabs of this type as spacing elements, therefore, transversely to the planar extent of the cover layers has only a limited load bearing capability. Furthermore, one tab has in each case only one spacing element which in turn has in each case to be separately fixed to a cover layer. The number of fixing points on the cover layer corresponds to the number of spacing elements and is thus double the number required in the case of bridges which require only one fixing point for fastening two spacing elements.

SUMMARY

It is, therefore, an object of the invention to provide a spacer structure for a sandwich construction and a method for producing such a spacer structure, wherein the sandwich construction formed from this spacer structure is intended to be configured so as to be more stable in relation to mechanical stress of the spacing elements and to be able to be produced in a simple manner.

The invention relates to a spacer structure for a sandwich construction, formed from a material web which is provided with a plurality of cuts and has a material web plane as a first plane, wherein a plurality of bearing surfaces, which are spaced apart from the first plane and are disposed in a second plane, are formed in portions by a forming process of the material web, wherein spacing elements in the transition region from the first plane to the second plane run in each case along a direction of extent from the first plane into the second plane, the spacing elements thus spacing apart the first plane from the bearing surfaces.

It is provided according to the invention that by the forming of the material web, which is carried out by bending the bearing surfaces out of the first plane, the bearing surfaces are twisted in relation to the first plane, on the one hand, and the spacing elements along the direction of extent thereof have distortions that are configured about the direction of extent of said spacing elements, on the other hand.

Core elements, which are formed in this manner and have spacing elements that are distorted about the respective direction of extent thereof and bearing surfaces, in a sandwich construction for the following reasons lead to more mechanical stability than sandwich constructions having spacing elements in the form of undistorted bridges and tabs that are bent out of a planar material web and deep drawn. The bearing surface along the external circumference thereof by way of spacing elements is connected to the material web portions that remain in the first plane. As a result, n spacing elements are implemented, depending on the shape of the bearing surface, where n=2, 3, 4, . . . , preferably where n=2 to 8. As a result, the face is very well utilized; a higher spatial-structural density of the core element is achieved by the sum of the distorted spacing elements, and the spacer structure is in this way more resistant to mechanical stresses.

A substantial and advantageous characteristic of the spacer structure according to the invention lies in that the material thickness, i.e. the dimension of the thickness of the material web, is not significantly changed in the forming process implemented as bending. In the context of the invention, significant means that no change in the material thickness arises, or said change is less than 10%. This leads to more stability and a higher continuous mechanical load bearing capability in comparison to deep-drawn spacing elements, on the one hand. On the other hand, in comparison to deep drawing, a significantly lower input in terms of energy is required for the forming process of bending the material web.

As a result of the spacing elements, and the associated bearing surfaces, in terms of the contour thereof being very compact in comparison to bridges, wherein the entire face within the contour is composed of the bearing surface and the spacing elements and not of material web portions in the first plane, the material remaining for the first plane can be configured in the form of continuous straps of a preferably constant width. The entire material of the material web remaining in the first plane, when arranged in a skillful manner, can thus be disposed in the form of continuous straps.

The distortion of the spacing elements, when viewed along the direction of extent thereof, is preferably less than 90°. The distortion of the spacing elements, this being a function of a number of spacing elements and/or of the geometric shape of the bearing surface, the design of the latter and the shaping depth used when bending, may however also be more than 90°. A maximum distortion is achieved when the bearing surfaces, while bending the bearing surface out of the material web and when subsequently additionally twisting the bearing surface, are shaped and rotated out of the material web so far that a start region of the spacing element on the first plane and an end region of the spacing element on the bearing surface, when viewed in a plan view from above of the material web, come to overlap and thus lie on top of each other. A maximum twisting of the bearing surface in relation to the first plane, when viewed in a plan view from above of the material web in the first plane, is in this instance approximately 360° divided by the number of spacing elements per bearing surface, for example at most 90° in a spacer structure with four spacing elements in a fully developed bearing surface. The degree of distortion of the spacing elements is also less, depending on the shaping depth and the number of spacing elements per bearing surface. The distortion of the spacing elements increases, and Euler's buckling load increases as a result, depending on the degree or the height of the shaping. The tendency toward buckling is reduced by the distortion of the spacing elements, because sub-regions of the respective spacing element no longer lie in the preferred buckling direction, or may even be situated transversely to the latter. When viewed in the originally preferred buckling direction, the effective buckling length of the respective spacing element is shortened as a result.

The oblique positioning and the identically directed sense of rotation of the spacing elements of the spacer structure, under a tensile and/or compressive load with a force component perpendicular to the bearing surface, generate on the bearing surface a torque which is a function of the angle of attack of the spacing elements and of the size of the bearing surface. For example, if the bearing surface as the core element of a sandwich construction is fixed to an upper cover layer, a torque thus is created at a joint where the upper cover layer is fixed to the bearing surface. This can be utilized for achieving a targeted failure of this join when a specific amount of load is exceeded. The strength of the connection can furthermore be set by way of the size and the position of the joint on the bearing surface.

The spacer structure is able to be produced from a material web so that only a single, preferably integral, element is required for the production of said spacer structure. As a result, the spacer structure can be produced as a mono-material. If an upper cover layer composed of the same material is additionally used, and if no other type of material is used as a result of the joining process such as in resistance welding, for example, the entire sandwich construction can by produced as a mono-material. Such a mono-material construction can be very easily recycled.

A further advantage of the spacer structure lies in that the latter is formed without a deep drawing step but by a bending step. In comparison to bending, significantly higher mechanical forces and thus significantly more complex and more expensive tools are required for deep drawing. This issue is avoided in the case of the spacer structure such that the latter can be produced in a simpler and more cost-effective manner in comparison to a deep-drawn component.

A further important advantage of the spacer structure lies in that the bearing surfaces, as opposed to deep drawing, by means of the bending forming process are twisted in relation to the first plane. If each twisted bearing surface by way of joints is now individually fastened to a planar covering element, and a sandwich construction is thus configured, rotating the bearing surfaces by bending the latter back in the direction of the material web can no longer take place. The reason for this lies in that the torques arising at the various joints of the various bearing surfaces block one another.

At least one joint per bearing surface is established when the bearing surfaces are joined to further components, such as the covering element, in order for a sandwich construction to be configured. The joints on the bearing surfaces here are readily accessible and able to be inspected on both sides. Therefore, the spacer structure can be connected to the covering element by means of various joining techniques, in order for the sandwich construction to be produced. The covering element forms a second cover layer of the sandwich construction, while the spacer structure forms a first cover layer and one or a plurality of core elements of the sandwich construction. Material web portions, which after the forming process remain in the first plane, configure the first cover layer while the bearing surfaces and the spacing elements configure the core elements of the sandwich construction. Consequently, the usual construction of a sandwich construction from three parts, i.e. the first and the second cover layer with core elements disposed therebetween, is realized in the form of a two-part construction composed of a spacer structure and a second cover layer.

Instead of using a spacer structure and a covering element, it is also possible for a sandwich construction to be formed from two spacer structures. If the spacing between the respective core elements of a spacer structure is sufficiently large and in terms of the spatial disposal thereof positioned so as to be mutually adapted in both spacer structures, there is the possibility for a second spacer structure to be used instead of the covering element, wherein the core elements of both spacer structures are oriented in the direction of the respective other spacer element, and the bearing surfaces of the core elements are positioned between the core elements of the respective other spacer structure. The core elements of the two spacer structures in this instance protrude in each case into the gaps between the spaced-apart core elements of the other spacer structure. The spacer structures of this sandwich construction are nested by way of the core elements of said spacer structures.

Alternatively or additionally, the spacer structure by means of various joining techniques will be able to be, or can be, connected to a further spacer structure. Instead of a sandwich construction which is composed of two material webs, i.e. a spacer structure and a covering element, or composed of two nested spacer structures, a plurality of spacer structures will be able to be, or can be, stacked on top of one another. One advantage here lies in that the length of the individual spacing elements is reduced (for example to half, to a third, etc.) for an entire sandwich construction thickness, and the number of spacing elements per unit area increases, in particular to the power of two. Different configurations of spacer structures and covering elements are possible for this purpose.

In the simplest configuration, spacer structures and covering elements are stacked on top of one another and joined in an alternating manner, i.e. at least twice (spacer structure, covering element, spacer structure, covering element, etc.). The sense of rotation of the individual spacing elements here is irrelevant.

Likewise, a plurality of the nested sandwich constructions, or different types of sandwich constructions, can be stacked on top of one another.

In another variant, two sandwich constructions, each composed of a spacer structure and a covering element, are joined to one another. The first plane of the first spacer structure and the further first plane of the further spacer structure are joined to one another in the process. In this way, the surfaces of the first and of the further sandwich construction are oriented toward the outside and provided with the first or with the further covering element. The sense of rotation of the spacing elements of the respective spacer structures is irrelevant in terms of the stability. This sandwich construction is composed of four elements, wherein the cover layers with tensile stiffness and flexural stiffness lie on the outside, and the core of the sandwich is composed of two spacer structures with spacing elements which in each case bridge only half the height of the entire sandwich construction.

In one further variant, the bearing surfaces of a first spacer structure are joined to the further bearing surfaces of a further spacer structure, wherein the material web portions that remain after the forming process of the first spacer structure and after the forming process of the further spacer structure form the first and the second cover layer of the sandwich construction. Three different configurations are possible here.

In the case of two spacer structures, which on the respective bearing surfaces thereof are mechanically fixed to one another, the sense of rotation of the two bearing surfaces must be mutually identical, i.e. the first bearing surface and the further bearing surface are twisted in the clockwise direction or the counterclockwise direction. The sense of rotation refers to the twisting direction of the respective bearing surface, when said bearing surfaces are viewed along an identical viewing direction onto the sandwich construction. In the case of this first configuration, the sandwich construction formed from the two stacked spacer structures cannot be compressed when mechanical pressure is applied to said sandwich construction. The latter is inherently stabilized.

In the case of a second configuration, the bearing surfaces lying on top of one another, when viewed along the same viewing direction, have opposing senses of rotation, however. Therefore, the sandwich construction can be compressed, and the bearing surfaces in the process are twisted back to the original, i.e. non-developed, position thereof, so that this configuration is unstable.

In order to preclude the twisting in the case of bearing surfaces that are twisted in opposite directions, the bearing surfaces that lie on top of one another in the case of a third configuration can be mechanically coupled to adjacent bearing surfaces by way of a covering element which in the form of a sheet-metal plate is disposed between said bearing surfaces, the twisting to the original position being prevented as a result, so that the configuration of two spacer structures which are stacked on top of one another and have a centric covering element is mechanically stable.

The feature "cut" in the context of the present invention is understood to be a local separation of the material web that is directed perpendicularly to the spreading face of the material web and penetrates the entire thickness of the material web. Such cuts can be implemented in particular by means of blade cutting, i.e. without any macroscopic material loss of the material web, or alternatively by methods such as laser cutting or a waterjet cutting or plasma cutting with a comparatively minor macroscopic material loss, or furthermore alternatively be implemented as elongate, narrow punched structures with a macroscopic material loss which is higher in comparison to laser cutting or waterjet cutting or plasma cutting. A cut in the sense of the invention therefore also comprises an elongate narrow feature punched from the material web.

The term "bending" in the context of the present invention means that no significant change in the material thickness, thus the material cross section, of the material web takes place during the forming process. A significant change is understood to be a change of >10%.

The distortions of the spacing elements can be shaped close to the bearing surface, so as to be uniform along the direction of extent of said spacing elements, or so as to be gradual in steps. Material web openings are situated between the spacing elements. A further material web opening in the first plane is created as a result of the bearing surface and the spacing elements being bent out of the first plane such that material web portions, which after bending remain in the first plane, when viewed in a plan view from above of the first plane, surround the bearing surface and the spacing elements.

The material web preferably has a smooth surface. Alternatively, the material web may have a structured surface. The material web is preferably processed as a board, or when unwound from a roll or a so-called coil. Therefore, the material web, prior to the production of the spacer structure, may also be present so as to be already curved or bent, even when said material web is present so as to be planar in the manner of a board when the cuts are being incorporated. The material web is preferably of an integral configuration. The term "integral" is understood to mean that the material web along the dimensions thereof in terms of length and width is configured integrally and from an identical material, while said material web along the dimension thereof in terms of thickness may comprise different materials. In this way, said material web can be configured in a single layer, or as a layered composite, thus as a laminate.

Cuts in the material web are produced by incisions, wherein the bearing surfaces are formed by means of the forming process implemented as bending out of the original material plane of the material web, i.e. the first plane, wherein the bearing surfaces after at least one bending step lie in a second plane. The second plane can run so as to be parallel or inclined to the first plane. In any case, the second plane is spaced apart from the first plane, wherein the spacing from the first plane may vary when viewed beyond the face of the second plane. In order for the stability of the sandwich construction, for which the spacer structure is provided, to be locally adapted to arising forces and at the same time to be ideally space-saving, the material web from which the spacer structure is produced can be composed of so-called tailored blanks, the latter to be explained hereunder with reference to the sandwich construction. The latter are also referred to as made-to-measure sheets and are substantially sheet-metal panels which are assembled from a plurality of boards, or sheet-metal panels of variable thickness. The stability of the first or the second plane can be locally adjusted by means of the tailored blank. As a result, a higher degree of freedom with a view to designing a sandwich construction in terms of the spatial design embodiment of the latter is achieved.

The spacer structure has one or a plurality of core elements. A core element here is understood to be the combination of a bearing surface and the spacing elements thereof and the surrounding material web portions in the first plane. The core elements may have identical or different dimensions and spatial design embodiments. The core elements can be arbitrarily distributed, i.e. periodically or non-periodically, across the extent of the material web. Furthermore, the core elements may be identically or differently oriented in spatial terms. Spacings between the core elements may also be identical or different. Furthermore, the bearing surfaces of the core elements, in a plan view from above of the first or the second plane, may have identical or different shapes. As a result, the spacer structure, and sandwich constructions formed therefrom, can be of highly variable designs.

The bearing surface can be configured so as to be flat. The second plane is preferably disposed so as to be parallel to the first plane. However, the surface plane of the bearing surface can also be configured so as to be curved; in this instance, the second plane at least in portions runs at an angle of attack in relation to the first plane. Each bearing surface can be integrally configured with two to n spacing elements. Three to five spacing elements are preferably assigned to each bearing surface. Each bearing surface, conjointly with the spacing elements assigned thereto, forms in each case one core element. Therefore, the spacer structure is configured from one or a plurality of core elements which project from the first plane and are in each case surrounded by material web portions that lie in the first plane. The fewer spacing elements assigned to one bearing surface, the greater the spacing that can be implemented between the bearing surface and the first plane at a reference face of identical size.

The spacer structure does not only have a single core element but preferably has a multiplicity of core elements having in each case one bearing surface, the latter in the imaginary connection thereof configuring the second plane in the form of a surface plane. This second plane, which represents a sum of the structures shaped by the bearing surfaces and the imaginary connecting faces of the latter, is spaced apart from the first plane. The second plane in terms of structure is not continuous but interrupted between the individual bearing surfaces. The bearing surface, or the bearing surfaces, is/are preferably configured in such a manner that said bearing surface/bearing surfaces is/are connectable to in each case one further component that spans the bearing surfaces, such as a covering element, so as to produce a sandwich construction by way of in each case at least one joint. The covering element configures a third plane, or lies in a third plane. The second plane, which is formed by the bearing surfaces, and/or the third plane, which is formed by the covering element, can be flat or curved. When the spacer structure has a plurality of bearing surfaces, the material web has a multiplicity of cuts which are in each case assigned to one bearing surface.

The material of the material web that remains in the first plane is composed of individual material web portions that preferably surround the spacing elements. The first plane can also be configured so as to be flat or curved. The first plane, from which the spacing elements of the sum of shaped core elements emanate and from which the material web portions remaining in the first plane are formed, is spaced apart from the second plane. The first plane, in terms of structure, is thus also not continuous but configured so as to have gaps between the individual material web portions.

In one preferred embodiment, the bearing surface that is bent out of the material web in the plan view from above of the first plane has a twist angle of >5 degrees, preferably >10 degrees, more preferably >20 degrees, even more preferably >30 degrees in relation to the first plane. When the bearing surface is disposed so as to be parallel to the first plane, the twist angle in a plan view from above is obvious in this instance. In the case of the bearing surface being shaped obliquely, i.e. having one or a plurality of angles of attack in relation to the first plane, a projection of the bearing surface on the first plane would have to be relied on for determining the twist angle. A twist having a twist angle in the range between 20 to 60 degrees is particularly preferable.

The bearing surface furthermore preferably has a surface circumference, and the spacing elements are uniformly distributed along the surface circumference with a variance of less than 20 degrees, preferably 10 degrees, more preferably 5 degrees. The bearing surface has a surface center which in geometric terms is unequivocally defined in the case of a surface in the form of a square, rectangle, oval or circle, for example. In other bearing surface geometries, the center of the area forms the surface center. When viewed from the surface center along a circumference of 360 degrees, the spacing elements are uniformly distributed along the circumference with a variance of less than 20 degrees, preferably less than 10 degrees, and even more preferably less than 5 degrees. Such an arrangement of the spacing elements in the production of the spacer structure has the great advantage that the spacing elements, in the forming process implemented as bending the core elements out of the material web, perform the distortion arising along the direction of extent of said spacing elements in a self-acting manner, and the twist between the bearing surface and the first plane is established in the process. This means that a two-dimensional material web is transformed to a three-dimensional structure of complex design in a single bending step, and all of the spacing elements of a core element are created in the latter.

The cuts are in each case preferably configured so as to be linear. Furthermore preferably, these cuts have mutually identical shapes and designs. In one particularly preferred embodiment, each cut has a first leg and a second leg, wherein the first leg transitions to the second leg and forms a cutting angle between a direction of extent of the first leg and a direction of extent of the second leg, wherein the cuts are disposed about the bearing surfaces. It is guaranteed as a result that each bearing surface is assigned a predefined number of spacing elements. The cutting angle is preferably in the range from 40 to 140 degrees, preferably from 60 to 120 degrees. It applies to the entire value range of the cutting angle that the transition from the first leg to the second leg is performed in a consistent curvature, for example by way of a defined transition radius.

The cuts can furthermore have a third leg, wherein the first or the second leg transitions to the third leg, and a further cutting angle is enclosed between a direction of extent of the first or the second leg and a direction of extent of the third leg, wherein the cuts are disposed about the bearing surfaces.

In a furthermore preferred embodiment, the first leg is configured as a long first leg in comparison to the second leg which is configured as a short second leg. As a result, the bearing surfaces including respectively assigned spacing elements can be particularly easily implemented.

The cuts, when viewed from the long first leg toward the second short leg, in the material web have an identical sense of rotation which is oriented in the clockwise direction or the counterclockwise direction. As a result, a core element having a uniform structure can be produced by means of a forming process of the material web that is implemented as a bending step.

In a further preferred embodiment, in the material web the short second leg of an adjacent cut is disposed between the one long first leg of a cut and the bearing surface, wherein the spacing elements are configured between the long first legs and adjacent short second legs. In the case of an identical bearing surface area, number and length of the spacing elements, a length of a cut for producing one or a plurality of core elements, the latter having in each case a bearing surface and spacing elements assigned to the latter, is shorter than tabs or bridges, because one of the legs is used for generating the bearing surface area as well as for generating a spacing element and fulfills a dual purpose in structural terms.

A surface of the first and/or the second cover layer can be configured so as to be flat. Alternatively, the surface of the first and/or the second cover layer can preferably be structured, for example configured as a structured sheet-metal panel. Structured sheet-metal panels are planar construction elements provided with moldings. Provided as a result is a low-dazzle, diffuse reflection of light by virtue of light point resolution. Flexibility in the event of a thermal expansion can furthermore be provided when a structured sheet-metal panel is used. This applies in particular to local thermal expansion which would otherwise lead to a bulge-like deformation of the surface of the sheet-metal panel. The consequences of the impediment of a thermal expansion are reduced. The structural height of the structuring of the structured sheet-metal panel can be a multiple, and up to several multiples, of the layer thickness of the latter. Such sheet-metal panels are known inter alia as: honeycomb boards, structural sheet-metal panel, structure-rolled sheet-metal panel, pattern-rolled sheet-metal panel. Such structured sheet-metal panels are usually produced by embossing processes. Other structured sheet-metal panels which are particularly suitable for the sandwich construction according to the invention are so-called design or studded or relief sheet-metal panels by Borit Leichtbau-Technik GmbH, Herzogenrath, Germany, or bulged structures by Dr. Mirtsch Wölbstrukturierung GmbH, Berlin, Germany. Bulged structures are produced based on the prototype of bee honeycombs or the shells of tortoises and insects, which also have hexagonal shapes. The production of said bulged structures is a method of forming technology by way of which hexagonal, three-dimensional structures are incorporated in thin-walled materials such as steel and aluminum panels, plastic films, paperboard or paper. In order for these structures to be produced, a slight pressure is applied to the curved thin material and the latter is simultaneously supported. In the process, the material deflects in a quasi-self-organized and energy-minimized manner so as to form a 3D structure. The surface finish is however completely preserved in the process because no planar engagement by a tool takes place. As a result of this procedure, the sheet-metal panels created can be reinforced such that lesser sheet-metal panel thicknesses with the same stability can be used. The multi-dimensional reinforcements provide the material with a high stiffness in terms of flexing and bulging in all directions and with a lesser wall thickness. This makes it possible for components, in particular the covering element of the sandwich construction, with the same functionality to be produced at a significantly lower weight, and local stress maxima can simultaneously be compensated for by a harmonica effect. However, a reduction in weight is not the only advantage of the structured (bulged) sheet-metal panels. Structured bulged semi-finished products can be readily further deformed because they have a high plastification reserve for secondary forming processes. One advantage of the structured covering element of the sandwich construction is flexibility in the event of thermal expansion. When acoustically excited, the low inherent frequencies are displaced to the higher frequency range by the reinforcing structure. The irritating humming of thin-walled components can be minimized in this way. Moreover, the structured (bulged) material has damping characteristics, as a result of which the emission of structure-borne noise, rattling, for example, is reduced. First and/or second cover layers having a structured feature configured as so-called dimples can lead to a reduction of the flow resistance. Such structures having a dimple texture are known from golf balls, for example, and extend the trajectory of the latter. These characteristics render a sandwich construction formed from the spacer structure advantageous for lightweight automotive engineering, for example, for instance as a car body floor pan.

The first and/or the second cover layer can preferably be configured from an integral material web. However, this material web may also be composed of tailored blanks, which are also referred to as made-to-measure boards and are configured substantially as sheet-metal panels assembled from a plurality of boards, or as sheet-metal panels of different grades, or sheet-metal panels of variable thickness. As a result, the mechanical characteristics of the first and/or the second cover layer can be locally adapted to the arising forces.

As a result of the use of tailored blanks, the variation in terms of the thickness of the sandwich construction, the dimensioning of the spacing elements and the mutual spacings of the bearing surfaces in the second plane, the spacer structure and the sandwich construction in terms of the construction thereof are rendered adaptable to the local influences of forces and vibrations when dimensioning and producing the sandwich construction. As a result of the board(s) typically being assembled/welded from different material grades and/or sheet-metal thicknesses, it is made possible that different locations of the spacer structure or sandwich construction used as a component are adapted to local stresses, the latter otherwise requiring additional reinforcement parts. Further advantages lie in the savings in terms of weight and manufacturing costs. Preferred initial materials for the material web and/or the covering element are the following types of tailored blanks: In the tailor-welded blank (TWB), the individual sheet-metal panels of different thicknesses or grades are welded to one another. This is typically performed by means of laser-welding a butt joint. The diverse material combinations and geometries are advantageous. In the tailor-rolled blank (TRB), a sheet-metal strip is cold-rolled again, wherein the rollers generate different sheet-metal panel thicknesses by being moved up and down. The uniform transition between two thicknesses is advantageous. In the case of a patchwork, small sheet-metal panels such as patches are welded to one another by means of resistance spot welding or laser beam welding, or adhesively bonded to one another by means of structural adhesives.

In a further preferred embodiment, the spacer structure, besides the spacing elements, additionally has one or a plurality of tabs. The at least one tab extends so as to preferably emanate from the first plane. The at least one tab is preferably produced from one or a plurality of corresponding cuts, and by a forming process by means of bending. The at least one tab preferably has a series of cut edges, a surface, i.e. material web portions which are situated in the second plane or surface plane, and material web portions which lie in the first plane. As opposed to the core element or core elements which are mandatorily present in the spacer structure according to the invention and have a plurality of spacing elements disposed between the first and the second plane, there is only one connection present between the material web portions lying in the first plane and the surface here. When such a tab is being shaped/pushed out, the material of the tab needs to be bent only at two locations and is not inherently distorted. The plastic deformation arises only on the bends and is minor, corresponding to a bending angle configured and a bending radius configured. A tab of this type can be implemented by a bending and/or deep-drawing step.

Alternatively or additionally, the spacer structure, besides the spacing elements, furthermore has one or a plurality of bridges, wherein the at least one bridge preferably extends so as to emanate from the first plane. The at least one bridge is preferably produced from one or a plurality of corresponding cuts and by a forming process by means of deep drawing. As a result of the cutting and deep-drawing process, the bridge preferably has a series of cut edges, a surface which is situated adjacent to the second plane, and material web portions which lie in the first plane. As opposed to the tab described above, the bridge has at least two connecting webs which connect the plane, in which the surface lies, to the respective first plane of the spacer structure. The at least one bridge is preferably produced by cutting into/punching the material web and shaping/pushing out the bridge from the material web, wherein at least the connecting webs are plastically deformed by stretching. This stretching process is energy-intensive, requires special material in order to avoid cracking, and reduces the material cross section, this reducing the thermal conductivity between material web portions that form a surface and material web portions that lie in the other plane. Plastic deformation/stretching arises along the connecting webs and increases as the developed height increases. The bridge can have n connecting webs between the planes; said bridge preferably has 3, 4 or 5, even more preferably 2, connecting webs. However, these connecting webs are not distorted along the direction of extent thereof.

The shape and the dimensions of the individual spacing elements, bridges and/or tabs of the spacer structure can be constant across the face of the spacer structure or of the sandwich can structure in which the spacer structure is integrated. Likewise, adjacent spacing elements, bridges and/or tabs can have a mutual constant spacing and/or be identically spaced apart multiple times in one or in a plurality of directions such that a uniform matrix of spacing elements, bridges and/or tabs is created across the face of the spacer structure. Likewise, a completely arbitrary distribution of the spacing elements, bridges and/or tabs may be present, in which the individual spacings of adjacent spacing elements, bridges and/or tabs varies, and/or the orientation of the individual spacing elements, bridges and/or tabs is not parallel or runs in the direction of a line. The spacing elements, bridges and/or tabs can also be mutually twisted in an arbitrary manner. The size of the spacing elements, bridges and/or tabs may also vary across the planar extent. The latter does not mean only the developed height of said spacing elements, bridges and/or tabs, but quasi the length and/or the width of the base area of said spacing elements, bridges and/or tabs in the spacer structure or the sandwich construction. In this way, spacing elements, bridges and/or tabs of the same type, for example bridges in a narrow and wide embodiment, can thus be placed next to one another, the surfaces of said bridges being of identical width and the spacing elements of said bridges having dissimilar lengths. Different types of spacing elements, bridges and/or tabs can also be distributed across the sandwich face. Any arbitrary variation is conceivable and may be used in order to meet the requirements set for the spacer structure in an optimal manner. The spacer structure can be designed so as to be very flexible and therefore also has a wide field of application.

The spacer structure has one or a plurality of clearances and/or openings. An opening serves for ventilation, for example, as a conduit or as a space for installation parts. Moreover, the clearance or opening can serve for saving space or weight, thus reducing the construction height of the spacer structure at this location to the material thickness of the material web portions lying in the first plane. This can be expedient, for example, in order to achieve additionally required space at this location for one or a plurality of installations, for example for achieving space for installations in the engine bay in the case of a hood which as a sandwich construction has such a spacer structure.

One or a plurality of beads can preferably be incorporated on a spacing element so as to reduce on the material web portions lying in the first plane the characteristics of the spacing elements toward buckling under compressive stress when the individual spacing elements are exposed to pressure. For example for reinforcement along the direction of extent of the spacing element or the material web portion. The cross sections of the spacing elements and of the material web portions are linear, or rectangular having a rectangle width that corresponds to the width of the spacing element, and a rectangle height that corresponds to the material web thickness. Likewise, the material web portions that lie in the first plane are composed of regions or webs having a linear cross section. These regions having a linear cross section in the first plane can also be reinforced in relation to buckling by angling said regions or by embossing one or a plurality of beads in the latter. A flat material profile is thus quasi formed into an angle profile, or similar. The profiling can extend across the entire length or only a sub-region of the material web portion and/or of the structural element, in particular of the spacing element, that after forming remains in the first plane.

In order to reduce the notch fatigue at the ends of the cuts in the spacer structure, bores having a rounded contour are preferably provided on the ends of said cuts, or a formed feature is configured thereon. For example, a bore in the form of a drillhole which optionally has a collar or else is configured so as to be completely flanged may be situated on the respective ends of the cuts.

The invention furthermore preferably relates to a sandwich construction, having a spacer structure according to one or a plurality of the previously described embodiments, and a covering element which is fastened to the bearing surfaces.

Advantages of such a sandwich construction include that the latter is constructed from only two elements, is able to be produced as a mono-material and in a simple manner, and the joint is able to be accessed and inspected from both sides. As a result, various joining techniques can be used. Moreover, the sandwich construction is able to be passed through by a flow of gaseous or liquid media. The sandwich construction, by virtue of the structural configuration thereof, is furthermore easy to fill. Furthermore, the sandwich construction has an attractive design because said sandwich construction can have a smooth or structured surface, as has already been described above. The sandwich construction is able to be produced from the initial materials while completely preserving the surface finish.

The sandwich construction according to the invention is distinguished in particular in that:
  said sandwich construction can be composed of only two elements;
  said sandwich construction has a high degree of stiffness, even in association with minor material thicknesses and/or minor weight; the stiffness can be locally set;
  the shape of the sandwich construction is able to be adapted in a comparatively simple manner to external parameters such as, for example, the design of an external car body skin, engine bay installations, etc.;
  said sandwich construction has favorable acoustic characteristics and/or improved acoustics as a result of inherent damping, damped structure-borne noise, reduced clattering in particular in combination with a structured covering element;
  said sandwich construction requires minor plastification grades of the initial material in the production. As a result, the relatively high degrees of secondary forming can be represented and/or relatively very high forming reserves are provided for the secondary forming, or in the event of a crash impacting the sandwich construction;
  the surface finish is not compromised in the case of corresponding joining methods for joining the covering element and the spacer structure; and
  the sandwich construction is easy to harden in further method steps when selected steel types and joining techniques are used.

The inventive sandwich construction has a wide field of application in many different sectors. In the simplest form thereof, said sandwich construction is composed of only two elements, a first element, i.e. the spacer structure which configures the core elements and the first cover layer, and a second element, i.e. the covering element which forms the cover layer of a supporting structure or represents the second cover layer of the sandwich construction according to the invention, wherein the core elements comprise the spacing elements and bearing surfaces that form the connection point to the second cover layer. These two elements are preferably connected to each other in a form-fitting, force-fitting and/or materially integral manner. Created as a result is substantially a spatial supporting structure in which the core elements and optionally bridges and/or tabs between the material web portions of the spacer structure that lie in the first plane and the cover layer that lies in the third plane form the supporting structure bars of the supporting structure core. After the forming process of the material web so as to form the spacer structure, the material web portions that remain in the original first plane likewise form a cover layer of the supporting structure or the first cover layer of the inventive sandwich construction, wherein the bearing surfaces lying in the second plane serve only as a joint. That is to say that the sandwich construction has the covering element as the second cover layer, has the material web portions that lie in the first plane as a first cover layer, and intervening core elements which in the manner of a sandwich are surrounded by the two cover layers.

In an alternatively preferred embodiment, the sandwich construction has at least two elements in the form of spacer structures. Said sandwich construction preferably has a first element as the spacer structure, which configures the core elements and the first cover layer, and a second element in the form of a further spacer structure, which configures a second cover layer and further core elements. The core elements in terms of their forming direction are oriented toward one another. There are again two preferred variants for this preferred embodiment.

In a first preferred variant, the spacer structure and the further spacer structure are fixed to one another via the respective bearing surfaces thereof, wherein, if appropriate, a further cover layer can be disposed between the bearing surfaces so that the sandwich construction then has three elements. The elements or three elements are preferably connected to each other in a form-fitting, force-fitting and/or materially integral manner.

In the case of the third element, thus the further cover layer, being absent in this first preferred variant, the respective sense of rotation of the bearing surfaces, when viewed in a plan view from above of the sandwich construction, can be important for the stability of the sandwich construction. When the sense of rotation of all bearing surfaces that come to lie on top of another is in the same direction, when viewed along the same viewing direction onto the sandwich construction, thus clockwise or counterclockwise, the sandwich construction cannot be compressed when a force is applied along the viewing direction. Said sandwich construction is stable.

If the sense of rotation of the bearing surfaces that come to lie on top of one another is opposed, the sandwich construction can be compressed and the bearing surfaces in the process are twisted back to the original, i.e. non-developed position thereof. This twisting can however be precluded by a further cover layer that runs so as to be centric and continuous between the bearing surfaces and is mechanically coupled to the bearing surfaces. For example, the bearing surfaces can be adhesively bonded or welded to the intermediate cover layer or be otherwise connected to the latter.

In a second preferred variant, the core elements of the two spacer structures in terms of the spatial density and arrangement thereof are configured such that said core elements are nested, i.e. engage in one another in such a manner that the bearing surfaces of the spacing element come to lie on the further first plane of the further spacing element and, conversely, the further bearing surfaces of the further spacing element come to lie on the first plane of the spacing element.

The sandwich construction can furthermore preferably also have four elements. For example, said sandwich construction has the spacer structure and the further spacer structure that form the core elements, and the combination of the two spacer structures on the external sides thereof is surrounded in the manner of a sandwich by two covering elements. The covering elements form the first and the second cover layer. More than two spacer structures may also be stacked on top of one another so as to form an even larger sandwich construction. An advantage of stacking at least two spacer structures on top of one another is that the length of the individual spacing elements, viewed across the entire sandwich construction thickness, is reduced (for example to half, to a third, etc.), and the number of spacing elements per unit area increases, in particular to the power of two. The sandwich construction becomes even more mechanically stable for this reason. The spacer structures stacked on top of one another can in each case have a multiplicity of core elements having in each case one bearing surface.

The sandwich construction is preferably configured so as to be self-supporting. This means that the sandwich construction does not require any frame element. Therefore, said sandwich construction is suitable as a hood of a motor vehicle, for example.

The sandwich construction can have one or a plurality of, for example two, covering elements. Said sandwich construction preferably has one covering element. The covering element or covering elements can be bulged. The sandwich construction is configured so as to be readily adaptable to the local influences of forces and vibrations. When the covering element or the covering elements is/are bulged, the bearing surface or bearing surfaces of the spacer structure are configured so as to be ideally parallel to the covering element, preferably at joints where the spacer structure and the covering element are connected to each other, so as to provide contact faces of the bearing surfaces ideally completely as joining faces. Gaps at the joints can be avoided as a result. When the first plane of the spacer structure and/or the covering element are not disposed so as to be mutually parallel, the bearing surface or bearing surfaces is/are in each case preferably correspondingly inclined in relation to the covering element. When the first cover layer and/or the second cover layer are curved or bulged, said first cover layer and/or said second cover layer, for example on the peripheries thereof, can furthermore be joined or connected to each other at one or a plurality of joints. The first cover layer can also optionally be connected to a further covering element.

A local height of the sandwich construction is independent of a size of an adjacent core element, a larger core element correspondingly disposed there enables a larger spacing between the first cover layer and the second cover layer than a comparatively smaller core element in the sandwich construction. The core elements can be distributed within the sandwich construction in an arbitrary manner, i.e. periodically or non-periodically. Furthermore, the core elements can be oriented identically or differently in spatial terms. The sandwich construction can have a plurality of core elements of identical size or of different sizes. Spacings between the core elements in the sandwich construction can also be configured identically or differently.

The two cover layers are preferably produced from a board-shaped material, for example in the form of a sheet-metal panel. Techniques such as, for example welding, clinching, riveting, screwing, etc., or combinations of these techniques, are used as a joining technique for joining the covering element and the bearing surface or bearing surfaces.

The sandwich construction preferably acts as a flat spatial supporting structure in a lightweight construction in which the dimension of the thickness or the height is very minor in comparison to the longitudinal extent. In principle, spatial supporting structures can function as a disk or a plate. When the forces engage perpendicularly to the supporting structure plane, reference is made to plates. In a disk, the forces act in the supporting structure plane. If a spatial supporting structure is curved, reference is made to a bowl. If disks or plates are homogeneous in terms of their structure, the behavior can be described as isotropic, thus independent of any direction. The stiffness is identical in all directions. However, if an anisotropy is present, the structure is non-homogeneous and displays a directional dependency of one characteristic.

The sandwich construction furthermore has an attractive design. Said sandwich construction can have a flat or curved design and is, therefore, able to be correspondingly adapted to a required design. In one preferred embodiment, the covering element is configured as a flat face. Alternatively or additionally preferably, the covering element is configured as a face with one or multiple curvatures, or a face with one or multiple bulges. The spacer structure preferably has a multiplicity of bearing surfaces of identical or dissimilar configuration. Bulges or curvatures can be of identical or dissimilar configuration. A curvature or bulge can be configured so as to be two-dimensional or three-dimensional. A spacing between the first cover layer and the second cover layer can vary in an arbitrary manner. Instead of a curvature or bulge, both cover layers may also have corrugated or arbitrary other shapes.

The covering element can have a smooth surface or be structured. The sandwich construction is entirely mono-material, depending on the materials used. Mono-material means that all elements of the sandwich construction are composed of the same material, wherein joining techniques are used for joining the spacer structure and the covering element in which no further material such as, for example an adhesive, a solder, a welding rod which is composed of another material is used. When the entire sandwich construction is mono-material, said sandwich construction is very easily recyclable. However, the sandwich construction can also be composed of a plurality of different materials. The spacer structure and the covering element, or else the joining structure or means such as, for example an adhesive, a rivet or a solder, herein can be composed of different materials. Preferred materials for the spacer structure and the covering element are sheet-metal panels, but plastics boards, fiber composite boards, wood or paper and laminates made from a planar combination of these materials can also be used.

The first covering element can be flat, for example, like the sheet-metal panel from which said first covering element is produced, or else, prior to the use of the latter in the sandwich construction, can have been bulged in an arbitrary manner. Said first covering element can have a shape, for example such as the skin of a car body component, for example, the latter having been produced by means of a deep-drawing process. The covering element can have regions of a convex and/or concave shape and/or flat regions.

The covering element preferably has one or a plurality of clearances and/or openings. An opening serves for ventilating, for example, as a conduit or as a space for installation parts. Moreover, the clearance and/or opening can serve for saving space or weight. Furthermore, an opening may be expedient, for example, for providing additionally required space at this location for one or a plurality of installations in a complex final product, for example a motor vehicle.

The first cover layer and/or the second cover layer can furthermore have one or a plurality of moldings. The molding(s) can serve for positioning the sandwich construction in relation to a sandwich construction or another component disposed adjacent thereto. Furthermore, the molding(s) can serve as fastening points for a further component such as an adjacent sandwich construction.

For the insulation of noise and/or heat, the sandwich construction can optionally be equipped with insulation material, either by partially or completely filling said sandwich construction with insulation material or by placing an insulation on one of the cover layers. The insulation material can already be situated on one of the sandwich elements or be subsequently incorporated in the already adhesively-bonded sandwich construction, for example by injecting PU (polyurethane) foam. Said insulation material can be designed so as to be monolithic, i.e. compact, without cavities, or with expanded foam.

The covering element per se can optionally have a highly damping effect. Alternatively or additionally, an additional insulation material can be disposed on at least one of the two sides of the sandwich construction, in particular so as to be directed outward.

The sandwich construction can also be filled with a filler material for mechanically supporting the sandwich construction, and as a result minimize/prevent the buckling of the spacing elements and optionally the bridges and/or tabs under compressive stress, for example. Instead of insulation material, the filler material can serve for mechanically supporting the sandwich construction. A sandwich core which is filled with filler material will additionally mechanically stabilize the sandwich construction under the influence of great forces such as, for example in the event of a crash which causes heavy deformation, and support the spacing elements and optionally the bridges and/or tabs which are situated in the core of the sandwich construction in relation to buckling and absorb further deformation energy such that a crumple zone is provided within the sandwich construction. The sandwich construction is rendered more stable as a result. In particular in sandwich constructions with relatively great thicknesses and relatively long, narrow spacing elements and optionally bridges and/or tabs which tend to buckle under compressive stress, a filler material can be utilized for supporting the spacing elements and optionally bridges and/or tabs, and as a result for preventing buckling. Moreover, the filler material can support the sandwich construction in the case of normal forces acting on a sandwich plane. The filling of the sandwich construction can also take place in the same tool, in a manner similar to the polymer-metal-hybrid (PMH) technology in which a close, tubular aluminum profile is initially formed under high pressure and subsequently over-molded with plastics material in the same tool. Besides the supporting effect, the filler material can also fulfill the noise damping and/or heat insulating effect.

Cooling and/or heating elements can be integrated in the sandwich construction. Furthermore, lines or ductwork can be integrated. A line system for cooling and/or heating purposes can be incorporated in the sandwich construction. This line system, for example as a meandering pipeline made from a metal, can be placed prior to the joining process into voids of the spacer structure that are situated between the structural elements. However, any other routing of the lines may be chosen, or pipes made from another material, or a planar line system composed of two embossed plates that are joined to each other in a fluid-tight manner can also be used. At least one of the boards in the process is embossed in such a manner that a line system which has at least one inlet and one outlet and through which a liquid or gaseous medium can flow is created after the fluid-tight joining. The line system here can have clearances through which one or a plurality of elements, such as a structural element, of the sandwich construction protrude. Depending on the use of the type of structural elements and the mutual positioning of the latter, the lines may also be inserted through the individual structural elements. This can take place before or else after the process of joining the covering element and the spacer structure. A diameter of the pipeline used can be adapted such that the pipes are in mechanical contact with the elements of the sandwich construction. A particularly positive thermal transmission to the sandwich construction is made possible in this way.

In a manner similar to that of the pipeline for heating and/or cooling purposes, a line system of electrical lines, data lines or ductwork can be incorporated in the sandwich construction.

In order to better distribute forces acting on the force introduction points and to avoid local overloading of the sandwich construction, the sandwich construction can be locally provided with one or a plurality of reinforcements. The latter can be fastened to the spacer structure and/or to the covering element by way of an arbitrary joining method before, during or after the joining process. It is most expedient for the reinforcement(s) to be conjointly assembled when joining the sandwich construction.

It can furthermore be provided that at least one outer periphery, in particular two mutually opposite peripheries, preferably all peripheries, of the sandwich construction is/are formed by edge bending, for example. As a result, a profile suitable for reinforcement purposes, such as a box section, for example, can be configured. Such edge bending serves for further reinforcing the cover layers. It can also be provided that the sandwich construction comprises mountings such as fixing eyes, clamps, cable routings for electrical cabling. This design embodiment makes it possible to be able to dispense with further assembly material such as, for example cable ties, etc.

The sandwich construction can be self-supporting such as, for example a hood, or be mechanically connected to frame elements such as, for example a roof skin which is adhesively bonded to a space frame, for example. In the case of the first cover layer and the second cover layer not converging in a plane on the peripheries thereof, but remaining spaced apart, there is furthermore the possibility of connecting in a spaced-apart manner both planes formed by the two cover layers to a car body part that can be configured so as to be structural, such as a space frame profile, for example. The stability is further enhanced as a result of the external connection to structural parts.

The spacer structure as well as the sandwich construction are preferably lightweight construction elements. Such sandwich structures are very stiff in terms of bending and bulging while having a low weight. The core here can be composed of a solid material (polyethylene, balsa wood), foam (rigid form, metal film) or corrugated structures (such as in corrugated paperboard) or honeycomb (paper, paperboard, metal, plastics material). The core transmits thrust forces that arise and supports the two cover layers of the sandwich construction. A characteristic of the light core materials in terms of thermal insulation and acoustic insulation is preferably utilized. Sheet-metal panels, (ply-)wood, plastics boards or fiber composite materials are preferable as a first and/or second cover layer. Force introduction points can be provided with reinforcement inserts, for example.

Joining techniques to be considered for joining the bearing surface and the covering element are, for example, adhesive bonding, welding, clinching, riveting, screwing, etc., or combinations thereof. As opposed to adhesive bonding and in some welding and screwing methods, in the case of, for example, resistance spot welding or friction stir welding, clinching, or some riveting methods, it is necessary for the joint to be reached from two sides. This is possible in the case of the sandwich construction according to the invention such that a multiplicity of joining techniques can be used for producing the sandwich construction. This is not possible in the case of the otherwise customary sandwich constructions having two closed cover layers, because the latter block access to the interior of the sandwich construction and part of a joining tool cannot reach the joint as a result, such that the choice of joining techniques is reduced. Many of the advantages of such a large selection of joint techniques, such as the mono-material characteristic of the sandwich elements, or particular mechanical characteristics, cannot be utilized in the case of closed sandwich constructions, in contrast to the sandwich construction according to the invention.

In order to be able to locally adapt the stability of the sandwich construction to the forces arising, and at the same time be as weight-saving as possible, the covering element and/or the material web from which the spacer structure is produced can be composed of tailored blanks, vary in terms of the thickness thereof, or the dimensions of the individual core elements of the spacer structure and the mutual spacings thereof can vary.

The first and/or the second cover layer(s) of the sandwich construction preferably form a board, a disk or a bowl. Depending on parameters such as spatial conditions or design specifications, the first cover layer and the second cover layer must meet specific spatial specifications and have a specific shape, or must not protrude into a specific spatial region. As a result, a thickness that varies across the planar extent of the sandwich construction can result. In sandwich constructions which are not subject to any or only a few spatial parameters, or in which great sandwich construction thicknesses are locally desirable by virtue of the distribution of forces arising, said sandwich construction thicknesses can be utilized in a targeted manner in order to achieve high flexural stiffness at these locations.

The first cover layer and the second cover layer can be converged within the face of the sandwich construction, or else at the periphery of the latter, so as to minimize the sandwich construction thickness at these locations. One or both of the first and the second cover layers can also have a clearance in the face such that one of the cover layers is absent at that location, or an opening is created where both cover layers are absent. The two cover layers in the peripheral regions of the sandwich construction and also in the peripheral regions of the opening(s) can be connected to each other by means of the joining techniques mentioned or other joining techniques. Folding the one cover layer about the other cover layer is also suitable in order for both cover layers to be connected to each other.

The shape and the dimensions of the individual structural elements of the spacer structure can be constant across the face of the sandwich construction. Likewise, adjacent structural elements can have a constant mutual spacing and/or be identically spaced apart multiple times in one or in a plurality of directions such that a uniform matrix of structural elements is created across the face of the sandwich construction. Likewise, a completely arbitrary distribution of the structural elements may be present, in which the individual spacings of adjacent structural elements varies, and/or the orientation of the individual structural elements is not parallel or runs in the direction of a line. The structural elements can also be mutually twisted in an arbitrary manner. The size of the structural elements may also vary across the planar extent. The latter does not mean only the developed height of said structural elements, but quasi the length and/or the width of the base area of said structural elements in the sandwich construction. In this way, for example in the case of a sandwich construction with plane parallel cover layers, structural elements of the same type, for example bridges, in a narrow and wide embodiment, can thus be placed next to one another, the surfaces of said bridges being of identical width and the connecting webs of said bridges having dissimilar lengths and correspondingly a different angle of attack in relation to the first cover layer. Different types of structural elements can also be distributed across the sandwich construction face. Any arbitrary variation is conceivable and may be used in order to meet the requirements set for the sandwich construction by the application of the latter in an optimal manner.

The spacer structure and the sandwich construction are preferably used in the automotive sector. The spacer structure and/or the sandwich construction can however also be used in other fields of technology such as, for example aerospace, roof constructions or large supporting constructions, bulkheads or hull parts of a ship. In such large-area components, the structure sizes of the structural elements are correspondingly increased in comparison to the automotive sector. In the case of great material thicknesses it may also be necessary for the mechanical forming, for example of metals, to be carried out in the heated/annealed state so as to reduce the forming energy.

The sandwich construction in the automotive sector is preferably used in the construction of automobiles as a hood, for example, wherein the cover element preferably functions as an outer skin. Typical modes of car body construction nowadays are the unitary car body and the skeleton construction mode which is also referred to as a spaceframe. The advantages of the unitary car body, which since the 1950s has replaced the frame construction mode, are a lower weight as a result of the frame being dispensed with, better crash safety and better space utilization. The use of this construction mode in volume manufacturing is based on progress made in the machining of sheet metal, such as deep drawing and particularly spot welding. The stiffness which is usually guaranteed by the frame is achieved here by the compact sheet-metal skin and hollow sheet-metal cross sections having an ideally large cross section and thus modulus of resistance, for example in the sills or the A-, B- and C-pillars. Beads enhance the stiffness and increase the natural frequency so as to prevent resonance and thus humming. The skeleton construction mode in which closed hollow profiles which are connected to one another directly or by nodes and which form the skeleton of the vehicle has become popular in the last few years. Planar components such as the roof or the windshield can be connected to the skeleton in a stiff manner and absorb thrust forces. As a result, a relatively high degree of stiffness is achieved at a relatively low weight. A high degree of stiffness is important in order to minimize elastic deformations on joints with add-on parts and to avoid creaking noises when driving. Small gap clearances are therefore possible only in the case of very stiff car bodies. Furthermore, the stiffness influences the driving behavior, in particular on bad roads or in extreme situations. In order to withstand vibrations excited by the motor and the suspension, the natural frequency of the car body has to be correspondingly tuned. In order to meet the current requirements in terms of stability such as, for example crash behavior, weight and appearance of the car body, many new grades of steel have been developed, the latter either being very soft and readily deformable, for example IF (interstitial-free) steel, or while offering acceptable forming characteristics nevertheless being very much stronger, for example DP (dual phase) steel. Despite the higher density in comparison to other materials, a car body which is not heavier but cheaper to produce can be produced by way of a suitable combination of steel parts than from light metals which are not as strong and stiff as steel.

This is possible inter alia also by the application of tailored blank methods in which a sheet-metal panel is assembled from different material grades and sheet-metal panel thicknesses. This prefabricated semi-finished product is subsequently formed to the spacer structure or to the covering element.

The issue in the automotive industry lies in producing large-area, three-dimensionally formed sandwich constructions in a simple and cost-effective manner. Only very complex constructions are known in particular for sandwich constructions which resort to sheet-metal parts and avoid fiber composite materials. As a result of its flexible design and its simple production, the sandwich construction according to the invention is particularly suitable for the construction of car bodies.

The material web and the covering element are preferably made from board-shaped materials, preferably sheet-metal panels. Initial materials for the material web and the covering element may include: metal, for example steel, aluminum, magnesium and alloys thereof, composite materials, plastics or wood boards, fiber composite materials or sandwich hybrids produced from the materials mentioned above.

Besides steel, aluminum, magnesium and the alloys thereof, other light composite materials and metals are also suitable as initial materials for the spacer structure and/or the covering element. Suitable composite materials are, for example, Litecore® or Tribond® by the company Thyssenkrupp Steel Europe AG, Duisburg, Germany. Suitable fiber composite materials are, for example CRP (carbon fiber reinforced plastics material) or GRP (glass fiber reinforced plastics material).

A preferred material thickness for the initial materials in form of the board-shaped material web and/or of the board-shaped covering element when using the spacer structure or the sandwich construction in the automotive sector is 0.10 mm to 10.00 mm, more preferably 0.20 mm to 2.00 mm, even more preferably 0.25 mm to 0.60 mm.

A preferred structural elements size when using the spacer structure or the sandwich construction in the automotive sector is 5 mm to 300 mm, more preferably 10 mm to 100 mm, even more preferably 20 mm to 40 mm.

A smallest spacing between the structural elements when using the spacer structure or the sandwich construction in the automotive sector is preferably 1 mm to 300 mm, more preferably 2 mm to 30 mm, even more preferably 4 mm to 10 mm.

A preferred developed height when using the spacer structure or the sandwich construction in the automotive sector is preferably 1 mm to 100 mm, more preferably 3 mm to 30 mm, even more preferably 5 mm to 20 mm.

When using the spacer structure or the sandwich construction in other fields of technology, the material thickness, the core element size, the smallest spacing between the core elements, and the preferred developed height may deviate from the dimensional ranges mentioned in the context of the automotive application.

The invention furthermore relates to a method for producing the spacer structure according to one or a plurality of the previously described embodiments, said method comprising the following steps:

providing a material web that configures a first plane;
producing cuts having a first leg and a second leg, which adjoins the first leg, in the material web, wherein the cuts are disposed in such a manner that a multiplicity of bearing surfaces, when viewed along a rotation direction perpendicular to the material web, are enclosed by the cuts, and wherein, when viewed from the bearing surfaces, first legs and second legs of successive cuts in the rotation direction run in parallel or at an acute angle in relation to one another in such a manner that, as a result, spacing elements which run between the at least one bearing surface and the surrounding first plane of the material web are configured in the material web.

Provided according to the invention is bending the material web in the region of the bearing surfaces in such a manner that the bearing surfaces are spaced apart from the first plane and twisted in relation to the first plane, on the one hand, and the spacing elements are distorted about the direction of extent thereof by bending, on the other hand.

The incorporation of the cuts into the material web is preferably performed by means of blade cutting, laser cutting, waterjet cutting or punching. These processes are associated with no material loss of the material web, a minor microscopic material loss of the material web or a certain macroscopic material loss of the material web. In one preferred embodiment, the first leg of the cuts is configured as a long first leg, as opposed to the second leg which is configured as short second leg, wherein the cuts are incorporated into the material web in such a manner that said cuts, when viewed from the long first leg toward the short second leg, have an identical sense of rotation which is oriented in the clockwise direction or the counterclockwise direction.

In one preferred embodiment of the production method it is provided that, following the bending of the material web, a deep-drawing step and/or a bending step are/is carried out. A spatial position or the shape of the bearing surfaces is preferably changed as a result of the deep-drawing step and/or the bending step. Deep drawing refers to the tensile-compressive forming of a component by a deep-drawing press, the latter using forming tools such as, for example, holders or dies, operative media such as liquids or gases, or operative energy such as high-speed forming. The bending step up to a bending angle of approx. 60° can be performed automatically when pressure is exerted on the bearing surface. The change of the spatial position and/or the change of the shape of the bearing surface can be performed in one step, conjointly with bending out the spacing elements. Therefore, the method can comprise forced rotating of the bearing surface or bearing surfaces, in which the distortion of the spacing elements is continued even further. A developed height of the core element or core elements decreases in the process. In the context of the present invention, a change of the material thickness of the material web initiated by the forming of less than 10% is still to be considered bending and not deep drawing.

The method is preferably carried out as an in-line method by means of eccentric presses or spindle presses, or in a rotary die cutter and a subsequent bending-out device. As a result, the spacer structure can be continuously produced with high quality and at low costs.

The machining of the material web by means of eccentric presses or spindle presses comprises a reciprocating cutting and optionally forming method which is preferably performed by a progressive tool. The material web in the progressive tool here is cycled by the respective advancing length through the tool until the last station is reached. The core elements are successively produced and the inner and outer shape formed in the plurality of operating strokes in the individual stations of the punching tool. The individual operating strokes may comprise cutting, punching, flanging, shaping steps or deep-drawing steps.

The machining of the material web by means of the rotary die cutter comprises a rotating cutting method in which the material web is guided between two rotating punching elements such as rollers, while one of the punching elements is pressed against the other so as to carry out a punching procedure for producing the cuts. Advantages of a rotary die cutter include a relatively high production rate and a relatively low punching pressure. A rotary die cutter usually has a ram or a die. However, one of the punching elements may have one or a plurality of blades, for example. The bending-out device can likewise have two rotating rollers, wherein one of the rollers has a shape such that a bending procedure takes place while the material web is guided between the two rollers and one roller is pressed against the other.

Alternatively, all or some of the individual operating steps can be performed in separate tools and/or different presses.

The production method furthermore preferably comprises a method step for hardening and/or press hardening. The step of hardening and/or press hardening can be carried out as a separate step, downstream of bending, or be integrated in the bending step.

Press hardening, which is also referred to as hot stamping, is possible when the spacer structure is configured from a high tensile steel or a super high tensile steel. As a result, the production of thinner and thus lighter car body components is made possible in particular while maintaining the same crash safety. Suitable to this end are in particular commercially available steel grades having tensile strengths of 1500 MPa and more. In press hardening, the material is initially austenitized at a temperature of approximately 950° C. in a continuous furnace. The crystal lattice structure of the steel is changed as a result. The material, which is red-hot in this instance, is placed in a press which is equipped with a special water-cooled forming tool. The forming process in press hardening initially begins as it also does in other forming methods: The tool forms the material while the press is being closed. However, in press hardening the press continues to keep the tool closed once the lower dead center has been reached. The material is quenched during this dwell time and the heat is dissipated by way of the tool in a few seconds. The dwell time is usually less than 20 seconds and is a function of inter alia the component surface, the quantity of the material, the thermal conductivity of the tool steel and the desired hardness of the component. After the dwell time, the component is retrieved at a temperature between 150 and 250° C. As a result of the rapid cooling, a martensitic microstructure is configured in the steel, which ensures a high degree of hardness. For this reason, components which are produced by means of press hardening are usually subsequently cut using laser machines.

The sandwich construction can be hardened after joining, or the spacer structure and/or the covering element are hardened prior to the joining process for joining the spacer structure and the covering element. A raft of materials are suitable for hardening, inter alia so-called manganese-boron steels. The hardening process can take place locally. Alternatively, after a hardening process the hardness can be locally removed again by heating. The process of press hardening can also be carried out locally. In this instance, the pressing tool is only locally cooled.

BRIEF DESCRIPTION OF THE DRAWINGS

The invention will be explained in more detail hereunder with reference to appended drawings of a few preferred embodiments. In the drawings, schematically and not to scale:

FIG. 1 shows a plan view from above of a material web, having disposed therein cuts for a fragment of a first embodiment of the spacer structure, from which a bearing surface with three spacing elements can be developed;

FIG. 2 shows a perspective view of a fragment of a first embodiment of the spacer structure with three spacing elements which are developed from a material web similar to that shown in FIG. 1;

FIG. 3 shows a further perspective view of a fragment of the first embodiment of the spacer structure, having a bearing surface with three spacing elements, similar to the variant shown in FIG. 2;

FIG. 4 shows a plan view from above of a further material web having disposed therein a multiplicity of cuts according to the arrangement from FIG. 1;

DETAILED DESCRIPTION

Figure 5:
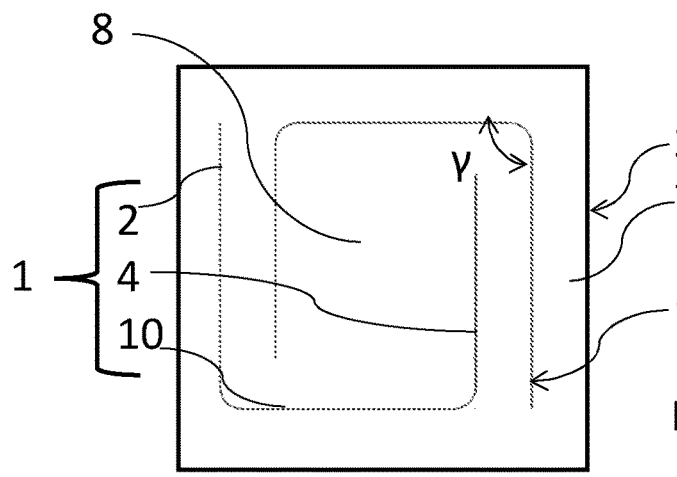
FIG. 5 shows a plan view from above of a further material web having cuts for the development of a bearing surface with two spacing elements.

FIG. 1 shows a plan view from above of a material web. The material web 3 in the plan view from above is configured as a triangular board. Said material web 3 has three cuts 1 which have in each case a first leg 2 and a second leg 4, wherein the first leg 2 transitions to the second leg 4, and a cutting angle γ is enclosed between a direction of extent of the first leg 2 and a direction of extent of the second leg 4. The cuts 1 are disposed about a bearing surface 8 to be configured. The first leg 2 is configured as a long first leg, as opposed to the second leg 4 which is configured as a short second leg. Spacing elements (not provided with reference signs in FIG. 1) to be configured are disposed between the first leg 2 of each cut 1 and an adjacent second leg 4 of a further cut 1. The second legs 4, of shorter configuration, lie in each case between the bearing surface to be configured and a spacing element to be configured. Drill holes or collared bores, which are schematically illustrated as black dots without reference sign, are configured on each end of each cut 1.

FIG. 2 shows a perspective view of a fragment of a spacer structure according to a first embodiment. The fragment of the spacer structure shown in FIG. 2 is produced from a material web configured in a manner that is similar to that of FIG. 1 by means of bending/forming. The material web 3, which is provided with three cuts, in FIG. 2 has a material web plane as a first plane 7, wherein a bearing surface 8 has been configured by forming the material web 3 shown in FIG. 1, by way of bending said material web 3 in portions, said bearing surface 8 being spaced apart from the first plane 7 and disposed in a second plane. In the transition region from the first plane 7 to the second plane (not provided with a reference sign), three spacing elements 5 run in each case along an associated direction of extent E from the first plane 7 to the second plane. In this way, the spacing elements 5 space the first plane 7 apart from the bearing surface 8. The spacing elements 5, along the direction of extent E thereof, have a distortion about the direction of extent E of said spacing elements 5, said distortion being caused by the forming process of the material web 3 carried out as bending. The bearing surface 8 and the spacing elements 5 form a core element for a sandwich construction. Such a sandwich construction, in addition to the spacer structure, has a covering element which is configured as a second cover layer and is fixed to the bearing surface 8, while material web portions that lie in the first plane configure a first cover layer of the sandwich construction. The bearing surface 8 has a surface circumference. The spacing elements 5 are uniformly disposed along the surface circumference, preferably with a variance of less than 5 degrees.

The entire fragment of the spacer element is integrally configured. The lines illustrated at the start and the end of the three spacing elements 5 are only intended for highlighting the spatial transition from the spacing element 5 to the bearing surface 8, or to the material web portions lying in the first plane. In the case of a real spacer element formed from an integral material web 3, these transitions cannot be seen because of the uniform material.

FIG. 3 shows a further perspective view of a fragment of the first embodiment of the spacer element with three spacing elements 5, similar to the variant shown in FIG. 2. As opposed to the variant from FIG. 2, the collared bores and drill holes on the ends of the cuts, which previously have only been illustrated as black circles, are shown in more detail here. Furthermore, this variant of the spacer element has beads 12 which extend as shapes along the spacing element 5 and additionally stiffen the latter.

FIG. 4 shows a plan view from above of a further material web 3. The material web 3 shown in FIG. 4 corresponds to the material web shown in FIG. 1, with the difference that the material web 3 is not configured as a triangular board but as a rectangular board and has not only three cuts 1 but a multiplicity of in each case three cuts 1 in the spatial arrangement according to FIG. 1, said cuts 1 being in each case disposed about a bearing surface (not provided with a reference sign here) to be configured. As a result, a spacer structure which has a multiplicity of core elements can be produced by means of the material web 3 in that the bearing surface is in each case bent out of the first plane of the material web 3 by a bending forming process, and the respective three spacing elements 5 are distorted along the direction of extent thereof in the process.

FIG. 5 shows a plan view from above of a fragment of a further material web. The fragment of the material web shown in FIG. 5 corresponds to the material web shown in FIG. 1, with the difference that the material web 3 is not configured as a triangular board but as a rectangular, in particular square, board and instead of the three cuts has two cuts 1, and each cut 1 next to the first leg 2 and the second leg 4 has a third leg 10 disposed therebetween. A spacer structure which has in each case two spacing elements for one bearing surface 8 can be produced by forming this material web 3.

Figure 6:
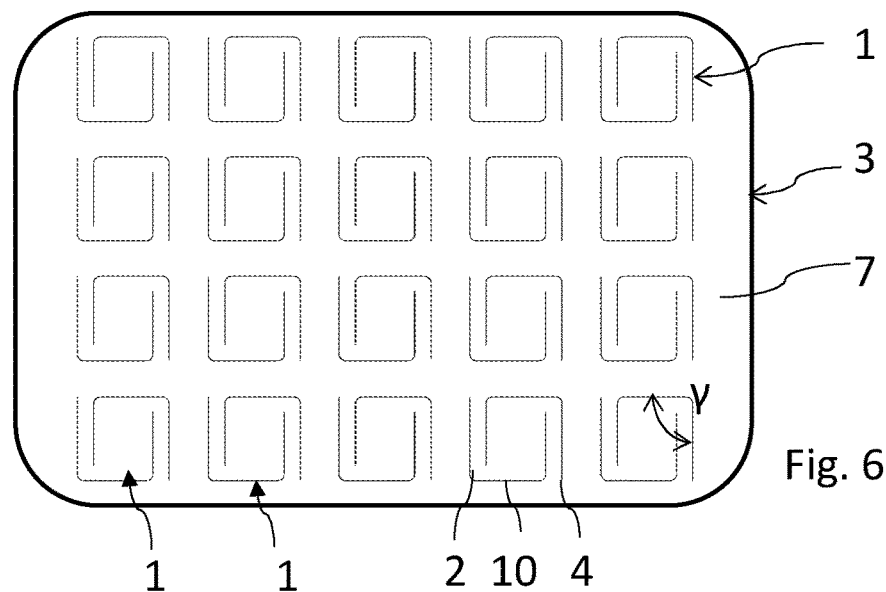
FIG. 6 shows a plan view from above of a further material web, having a multiplicity of cuts that are spatially disposed according to FIG. 5.

FIG. 6 shows a plan view from above of an even further material web. The material web shown in FIG. 6 has a multiplicity of in each case two cuts 1 in the spatial orientation according to FIG. 5, which are in each case disposed about a bearing surface (not provided with a reference sign here) to be configured. As a result, a spacer structure can be produced by means of the material web 3 in that the bearing surface is in each case bent out of the first plane of the material web 3 by a bending forming process, and the respective two spacing elements 5 are distorted along the direction of extent thereof in the process. The spacer element as a result has a multiplicity of core elements.

Figure 7:
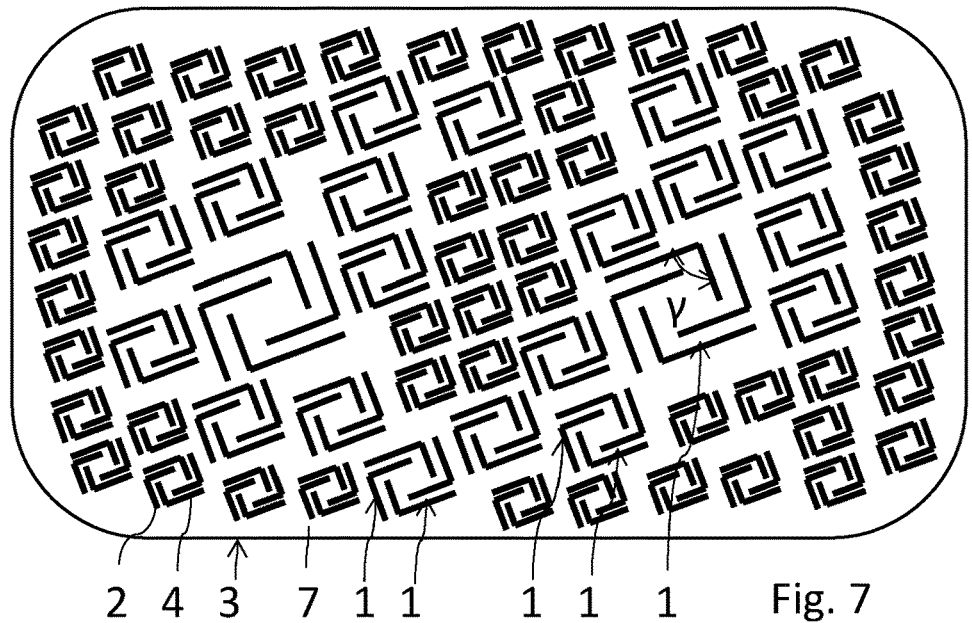
FIG. 7 shows a plan view from above of a further material web, having a multiplicity of cuts by way of which a multiplicity of bearing surfaces, each with four spacing elements, can be developed.

FIG. 7 shows a plan view from above of a further material web. The material web 3 shown in FIG. 7 has a multiplicity of four cuts 1 which are in each case disposed about a bearing surface (not provided with a reference sign here) to be configured, wherein a cutting angle γ, which is substantially rectangular, is enclosed between a direction of extent of the first leg 2 and a direction of extent of the second leg 4. Furthermore, different cuts 1 have different lengths of the first leg 2 and different lengths of the second leg 4. Therefore, a spacer structure produced from this material web 3 has core elements of dissimilar sizes.

Figure 8:
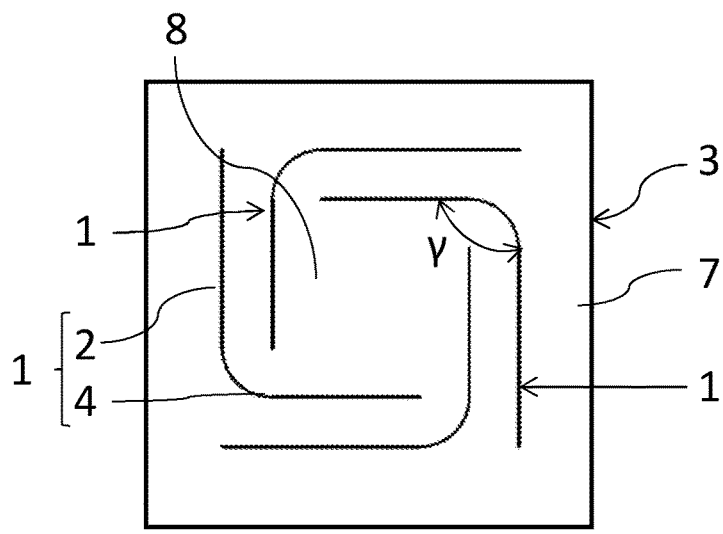
FIG. 8 shows a plan view from above of a material web, having four cuts by way of which a bearing surface with four spacing elements can be developed.

FIG. 8 shows a plan view from above of a fragment of a further material web. The fragment of the material web shown in FIG. 8 corresponds to the fragment of the material web shown in FIG. 5, with the difference that the former has four cuts 1 having in each case one first leg 2 and one second leg 4 which are disposed about a bearing surface 8. A spacer structure which has four spacing elements can be produced from this material web 3. The cuts 1 are disposed in a counterclockwise sense of direction.

Figure 9:
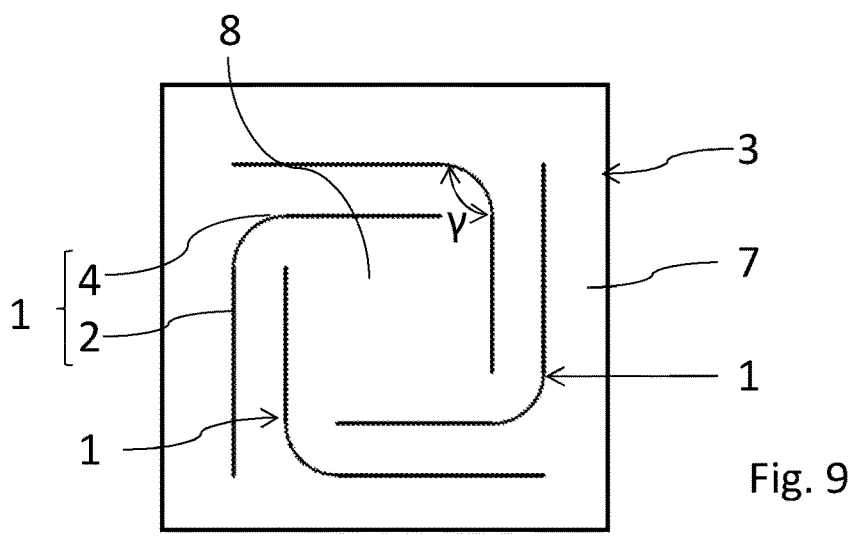
FIG. 9 shows a plan view from above of a further material web, having four cuts of which the rotation directions thereof are reversed in comparison to FIG. 8.

FIG. 9 shows a plan view from above of the fragment of a further material web. The fragment of the material web shown in FIG. 9 corresponds to the material web shown in FIG. 8, with the difference that the cuts 1 are disposed in a clockwise sense of direction.

Figure 10:
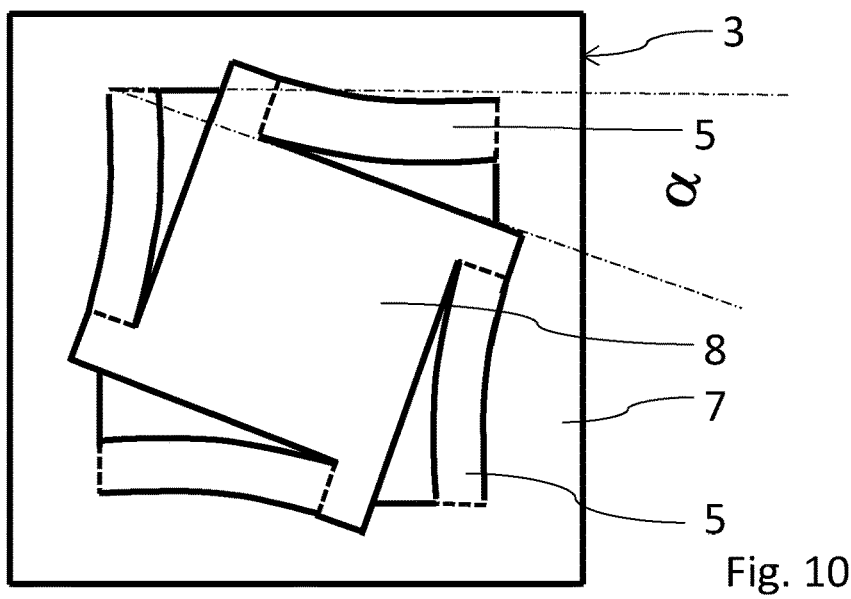
FIG. 10 shows a plan view from above of a developed bearing surface according to a second embodiment with four spacing elements.

FIG. 10 shows a plan view from above of a fragment of a spacer structure according to a second embodiment. The fragment of the spacer structure shown in FIG. 10 is produced from the very similar material web shown in the context of FIG. 8 by means of a forming process by bending. The material web 3 provided with four cuts in FIG. 10 has a material web plane as a first plane 7, wherein a bearing surface 8 is formed by a forming process in portions of the material web 3 shown in FIG. 1, said bearing surface 8 being spaced apart from the first plane 7 and disposed in a second plane. In the transition region from the first plane 7 to the second plane, four spacing elements 5 run in each case along a direction of extent from the first plane 7 to the second plane. The spacing elements 5 thus space apart the first plane 7 from the bearing surface 8. The spacing elements 5 along the direction of extent thereof have a distortion about the direction of extent of said spacing elements 5, said distortion being caused by the forming process of the material web 3 carried out as bending. The bearing surface 8 and the spacing elements 5 form a core element for a sandwich construction. Such a sandwich construction, not shown here, in addition to the spacer structure has a covering element which is configured as a second cover layer and fixedly connected to the bearing surface 8, while material web portions that lie in the first plane 7 configure a first cover layer of the sandwich construction.

The bearing surface 8 which is bent out of the material web 3, in the view onto the first plane 7, has a twisting angle α in relation to the first plane 7. This twisting angle α is created in the bending forming process caused by the erection of the spacing elements 5, the latter being created when the bearing surface 8 is pushed out of the material web 3.

Figure 11:
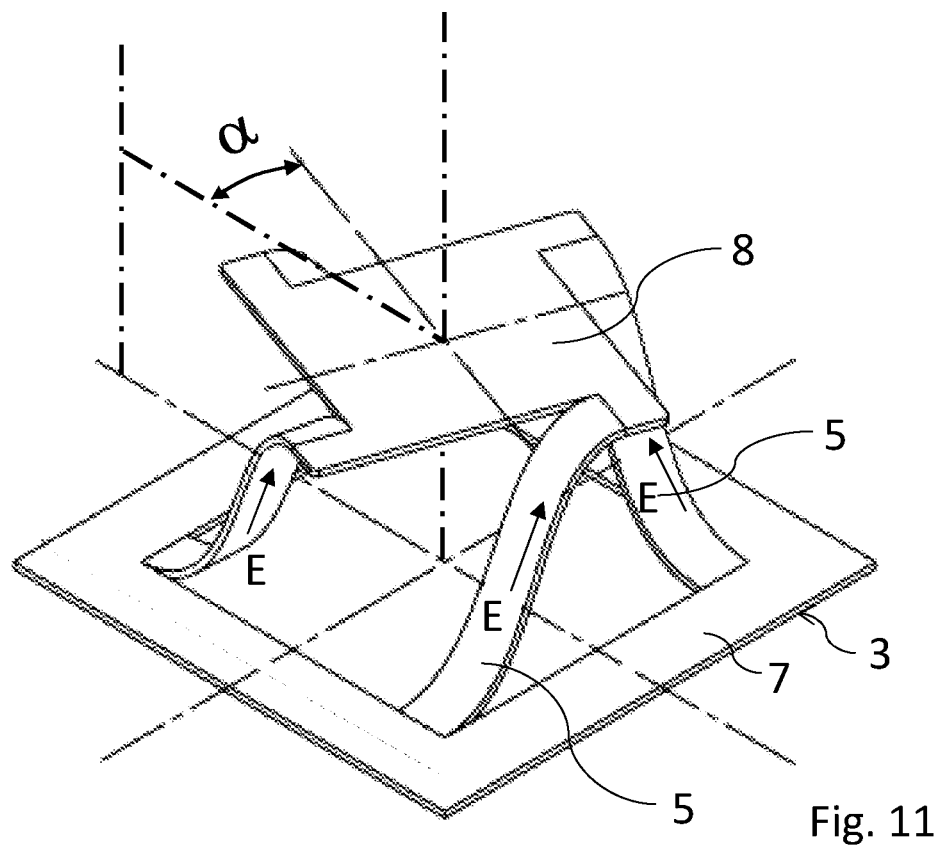
FIG. 11 shows a perspective view of the developed bearing surface shown in FIG. 10.

FIG. 11 shows a perspective view of the fragment of the spacer structure shown in FIG. 10. The spacing elements 5 are in each case distorted about the direction of extent E thereof. The bearing surface 8 is oriented so as to be substantially parallel to the first plane 7.

Figure 12:
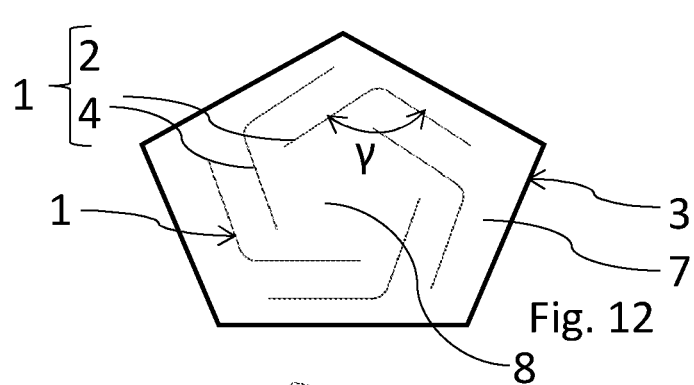
FIG. 12 shows a plan view from above of a further material web, having five cuts by way of which a bearing surface with five spacing elements can be developed.

FIG. 12 shows a plan view from above of a fragment of a further material web. The fragment of the material web 3 shown in FIG. 12 corresponds to the fragment of the material web shown in FIG. 1, with the difference that the fragment of the material web 3 is not configured as a triangular board but as a pentagonal board and has not only three cuts 1 but five cuts 1 which are disposed about a bearing surface to be developed.

Figure 13:
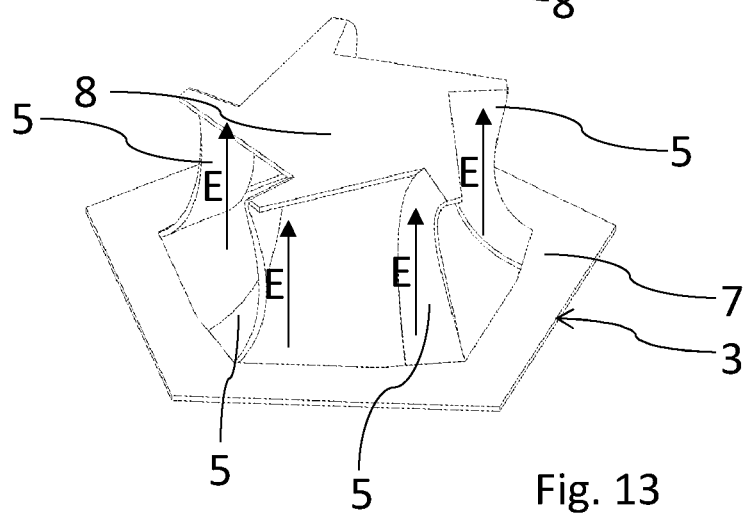
FIG. 13 shows a perspective view of a spacer structure according to a third embodiment, with five spacing elements developed from a material web which has five cuts disposed in a manner similar to that of FIG. 12.

FIG. 13 shows a perspective view of a fragment of a spacer structure according to a third embodiment. The fragment of the spacer structure shown in FIG. 13 has been produced from the material web shown in FIG. 12 by a bending forming process. The material web 3 provided with five cuts in FIG. 13 has a material web plane as a first plane 7, wherein a bearing surface 8 which is spaced apart from the first plane 7 and disposed in a second plane is developed by a forming process in regions of the material web 3 shown in FIG. 12. In the transition region from the first plane 7 to the second plane, five spacing elements 5 run in each case along the individual direction of extent E thereof from the first plane 7 to the second plane. In this way, the spacing elements 5 space apart the first plane 7 from the bearing surface 8. The spacing elements 5 along the respective direction of extent E thereof have a distortion about the direction of extent E thereof, said distortion being caused by the forming process of the material web 3 carried out as bending. The bearing surface 8 and the spacing elements 5, like the previously described spacer elements, form a core element for a sandwich construction.

Figure 14:
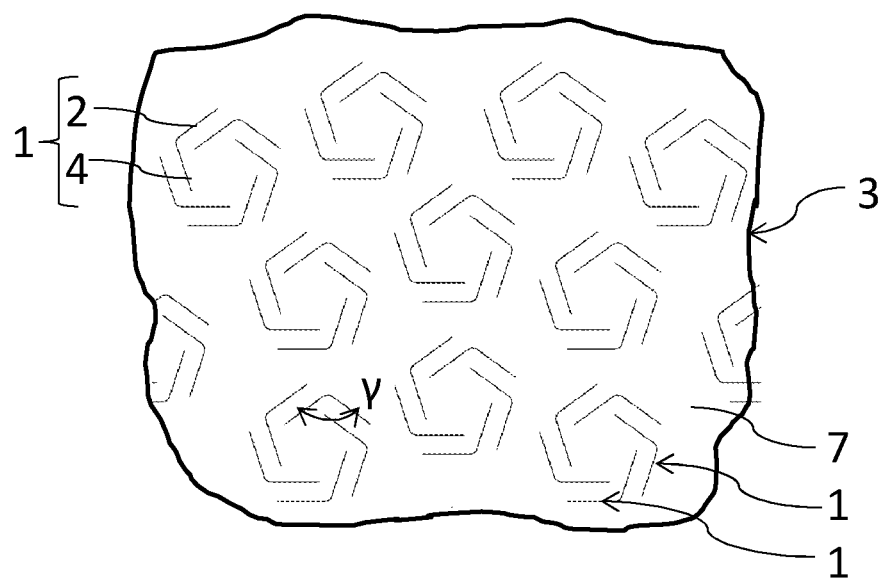
FIG. 14 shows a plan view from above of a further material web having a multiplicity of cuts according to FIG. 12.

FIG. 14 shows a plan view from above of a further material web. The material web shown in FIG. 14 is configured as a rectangular board and has a multiplicity of in each case five cuts 1 which are in each case disposed about a bearing surface to be configured. As a result, a spacer structure which has a multiplicity of core elements having in each case five spacing elements can be produced by means of the material web 3.

Figure 15:
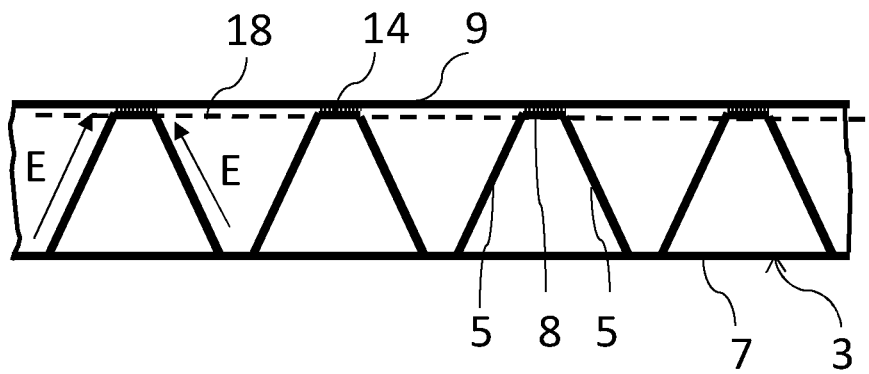
FIG. 15 shows a schematic cross-sectional view of a sandwich construction according to a first embodiment.

FIG. 15 shows a schematic cross-sectional view of a sandwich construction according to a first embodiment. The sandwich construction has a spacer structure and a covering element 9. The covering element 9 is configured in the shape of a board. The spacer structure is formed from a material web 3 which is provided with a plurality of cuts and has a material web plane as a first plane 7, wherein a plurality of bearing surfaces 8 are formed by a bending forming process in portions of the material web 3, said bearing surfaces being spaced apart from the first plane 7 and disposed in a second plane 18. In the transition region from the first plane 7 to the second plane 18, spacing elements 5 run in each case along a direction of extent E from the first plane 7 to the second plane 18, said spacing elements 5 spacing apart in each case the first plane 7 from one of the bearing surfaces 8. The spacing elements 5 along the direction of extent E thereof have a distortion about the direction of extent E thereof, said distortion here not being shown for the sake of clarity and being caused by the forming process of the material web 3 carried out as bending. The covering element 9 and each bearing surface 8 are connected to one another at joints 14, wherein the covering element 9 lies in a third plane. The covering element 9 forms a second cover layer of the sandwich construction, while material web portions of the material web 3 that lie in the first plane 7 form a first cover layer of the sandwich construction. The spacing elements 5 and the bearing surfaces 8 form core elements which are disposed between the two cover layers. These core elements can have two, three, four, five or more spacing elements. The plurality of bearing surfaces 8 conjointly form the second plane 18 which is spaced apart from the first plane 7. The first cover layer and the second cover layer here are configured so as to be flat and mutually disposed with parallel faces.

Figure 16:
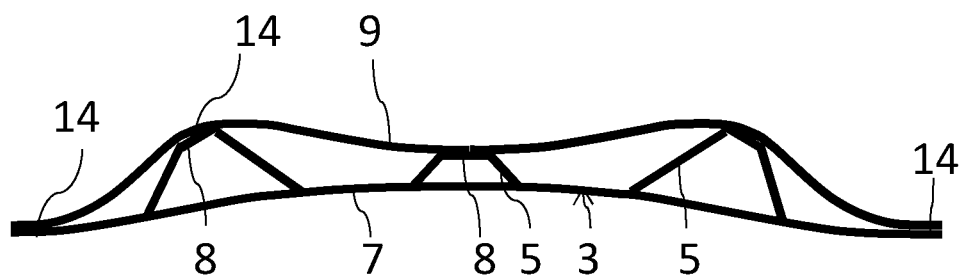
FIG. 16 shows a schematic cross-sectional view of a sandwich construction according to a second embodiment.

FIG. 16 shows a schematic cross-sectional view of a sandwich construction according to a second embodiment. The sandwich construction shown in FIG. 16 corresponds to the sandwich construction shown in FIG. 15, with the difference that the covering element 9 as well as the material web portions that remain in the first plane 7 after the forming of the material web 3 are bulged. This bending is illustrated only two-dimensionally here and can likewise be shaped into the third dimension, i.e. into the drawing plane. The bearing surfaces 8 at the joints 14 here are configured so as to be ideally parallel to the covering element 9. The bearing surfaces 8 are in each case inclined in relation to the covering element 9. Both cover layers are dissimilarly bulged. The bulge of the covering element 9, purely by way of example, is corrugated. The first cover layer and the second cover layer on the peripheries thereof are connected to each other at joints 14.

Figure 17:
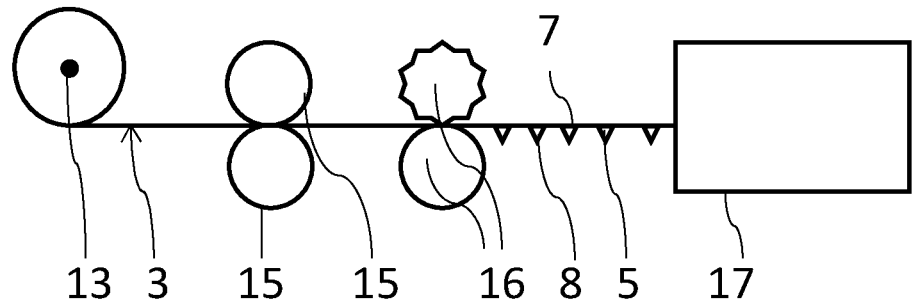
FIG. 17 shows a schematic illustration of a method for producing a spacer structure.

FIG. 17 shows a schematic illustration of a method for producing a spacer structure. A material web 3 is situated on a roll 13 (coil) and is unrolled and guided through a rotary die cutter having rollers 15, as a result of which cuts are incorporated into the material web 3. When complex cutting patterns are to be implemented, it may be necessary to provide further pairs of rollers such that the sum of the roller pairs reflects the sum of the cuts.

After passing through the rollers 15 for configuring the cuts, the material web 3 is guided onward through a bending-out device having a roller pair 16, the latter by means of a bending procedure forming the material web 3 such that a spacer structure according to the previously described embodiments or as a combination thereof is developed from the material web 3, said spacer structure having material web portions in a first plane 7, bearing surfaces 8 in a second plane, and disposed therebetween spacing elements 5. The spacer structure is subsequently fed to a further machining station 17. In the machining station 17 the spacer structure can be subjected to further machining steps, for example selected from the group of hardening steps, press hardening steps, deep-drawing steps and/or bending steps, and/or the spacer structure in a joining step is joined to a cover element (not shown) so as to produce a sandwich structure. The production method is preferably implemented as an in-line method for the cost-effective volume production.

Figure 18:
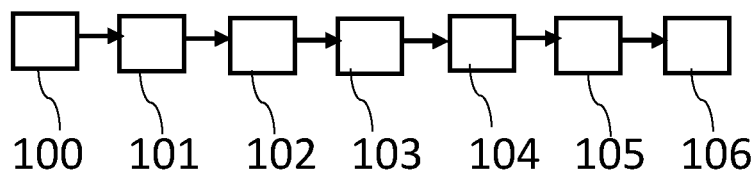
FIG. 18 shows a flow chart with the individual operating steps for generating a spacer structure or a sandwich construction.

FIG. 18 shows a flow chart in which the individual operating steps for generating a spacer structure or a sandwich construction are shown. First, a material web which configures a first plane is provided in a step 100. An optional step 101 can then be carried out so as to generate bores at predetermined locations in the material web.

In a further optional step 102, the bores generated in the optional step 101 are flanged or provided with a protrusion.

In the subsequent step 103, cuts having a first leg, and a second leg adjoining the first leg, are produced in the material web, wherein the cuts are disposed in such a manner that the bearing surfaces, when viewed along a rotation direction perpendicular to the material web, are in each case enclosed by the cuts, and wherein, when viewed from the bearing surface, first legs and second legs of cuts that are mutually successive in the rotation direction run in parallel or mutually run at an acute angle in such a manner that spacing elements which run between the bearing surfaces and the surrounding first plane of the material web are configured as a result. Depending on the complexity of the cutting pattern to be implemented, it may be necessary for the cuts in the method step 103 to be successively incorporated into the material web.

If the step 101 has been carried out, the cuts in the step 103 are generated in such a manner that the bores lie at the ends of the cuts.

In an optional step 104, further cutting process are optionally carried out; for example, further cuts which serve for generating one or a plurality of bridges in a further step 105 are produced. In the subsequent step 106, the material web in the region of the bearing surface is formed by bending in such a manner that the bearing surfaces are spaced apart from the first plane, and the spacing elements as a result of bending are distorted about the respective directions of extent thereof.

Figure 19:
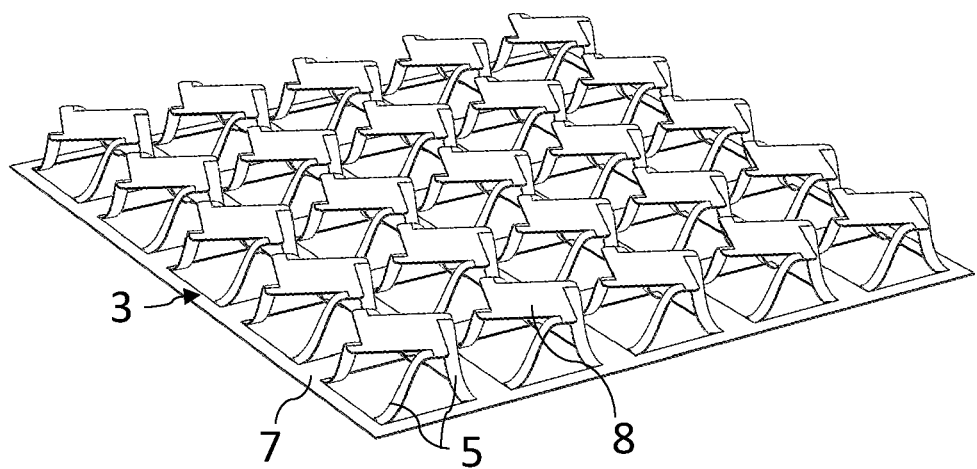
FIG. 19 shows a perspective view of a spacer structure according to a fourth embodiment.

FIG. 19 shows a perspective view of a large-area spacer structure according to a fourth embodiment. The spacer structure has a material web 3 and is produced by means of a forming step that comprises bending. The material web 3 has the material web plane as a first plane 7, wherein by cutting into and forming from this material web a multiplicity of core elements having in each case one bearing surface 8 are bent and rotated out of the material web in the clockwise direction, as is shown in FIG. 11. The bearing surfaces 8 are spaced apart from the first plane 7 and disposed in a second plane. In the transition region from the first plane 7 to the second plane, a multiplicity of spacing elements 5 run in each case along a direction of extent from the first plane 7 to the second plane. In this way, the spacing elements 5 space apart the first plane 7 from the bearing surface 8. The spacing elements 5 along the direction of extent thereof have a distortion about the direction of extent thereof, said distortion being caused by the forming process of the material web 3 carried out as bending. The bearing surfaces 8 and the spacing elements 5 form core elements for multi-part sandwich constructions of which examples with different variants in terms of the number, disposal and sense of rotation of the bearing surfaces 8 are shown in the following figures.

Figure 20:
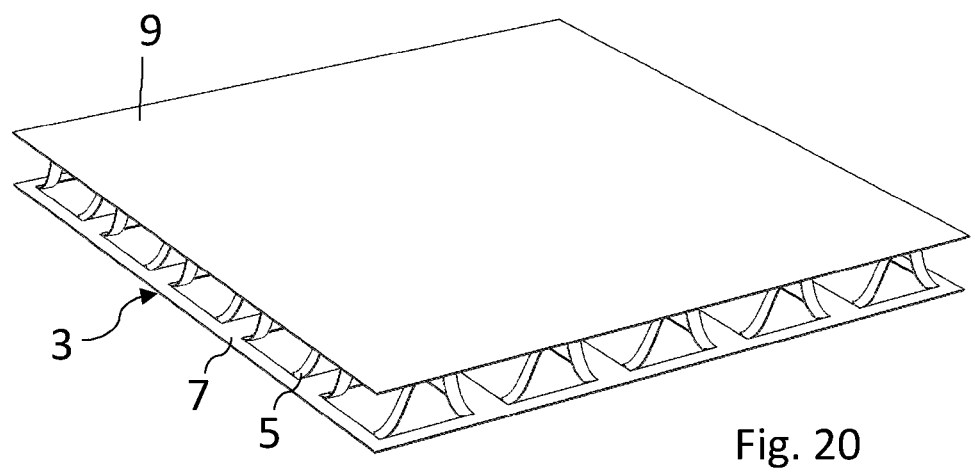
FIG. 20 shows a perspective view of a sandwich construction according to a third embodiment.

FIG. 20 shows a perspective view of a sandwich construction according to a third embodiment. The sandwich construction has the spacer structure shown in FIG. 19, and a covering element 9. The covering element 9 is connected to the multiplicity of bearing surfaces (not to be seen here). To this end, the covering element 9 is connected, for example in a materially integral manner, i.e. adhesively bonded or welded, to bearing surfaces 8 and forms a second cover layer, while the material webs 3 that lie in the first plane 7 form the first cover layer.

Figure 21:
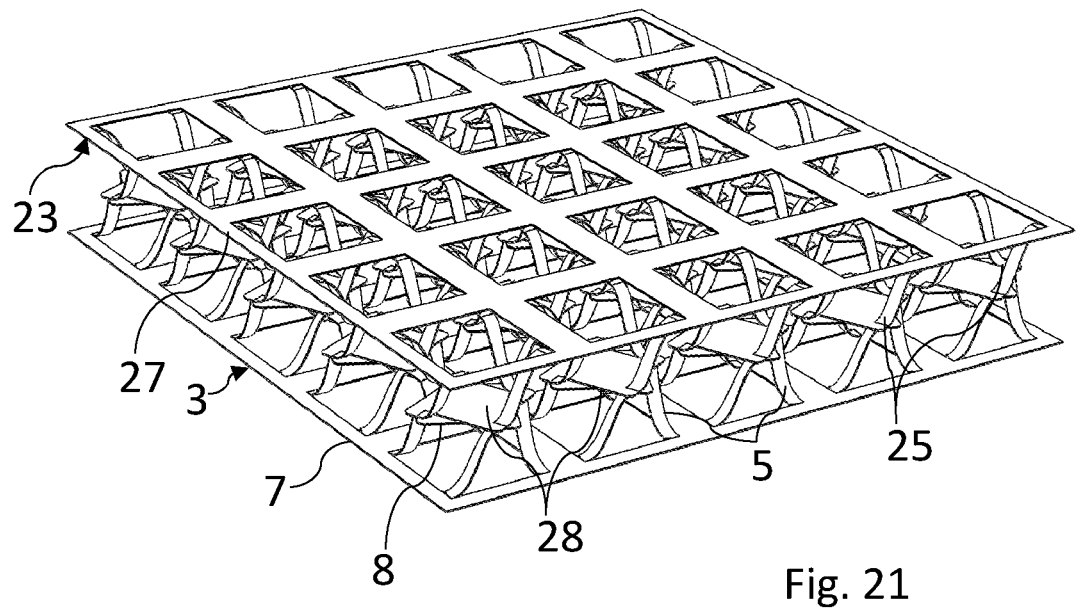
FIG. 21 shows a perspective view of a sandwich construction according to a fourth embodiment.

FIG. 21 shows a perspective view of a sandwich construction according to a fourth embodiment. The sandwich construction has the spacer structure shown in FIG. 19 as the first spacer structure which on the first plane 7 thereof is fixed to the further first plane 27 of the further spacer structure. The further spacer structure has a further material web 23, wherein the further spacer structure is produced in the same way as the first spacer structure. The further spacer structure displays a further first plane 27 and a multiplicity of further bearing surfaces 28, wherein the further bearing surfaces 28 are rotated out of the further first plane 27 by way of a multiplicity of further spacing elements 25. When viewed in the forming direction, the further bearing surfaces 28 have the same sense of rotation as the bearing surfaces 8 of the other spacer structure. The bearing surfaces 8 and the further bearing surfaces 28 are, by way of example, connected to each another in a materially integral manner. The bearing surfaces 8 and the further bearing surfaces 28, in the view onto the joined component in the form of the sandwich construction, have mutually opposite senses of direction, i.e. the bearing surfaces 8 are rotated out of the material web 3 in the clockwise direction, and the further bearing surfaces 28 are rotated out of the further material web 23 in the counterclockwise direction. As a result of the bearing surfaces 8 and the further bearing surfaces 28 being fixed to one another, the bearing surfaces 8 and the further bearing surfaces 28 cannot slide along one another in their opposite sense of direction. In this way, the sandwich construction remains the dimensionally stable and cannot be compressed in the direction of the thickness thereof. The material web 3, which lies in the first plane, forms the first cover layer, while the material web 23, which lies in the further first plane 27, forms the second cover layer of the sandwich construction.

Figure 22:
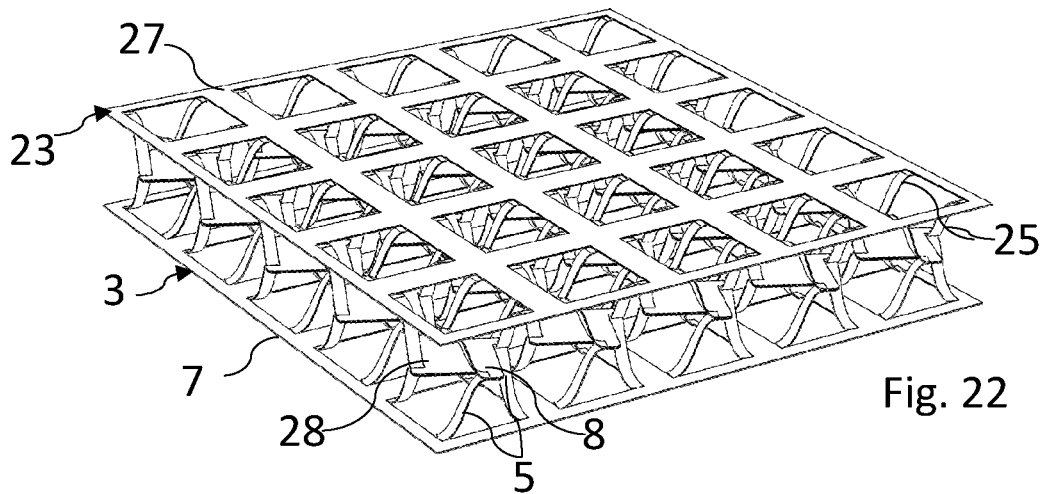
FIG. 22 shows a perspective view of a sandwich construction according to a fifth embodiment.

FIG. 22 shows a perspective view of a sandwich construction according to a fifth embodiment. The sandwich construction shown in FIG. 22 corresponds to the sandwich construction shown in FIG. 21, with the difference that the further bearing surfaces 28, when viewed in the plan view from above of the sandwich construction, have been rotated out of the further material web 23 in the same sense of rotation, specifically in the clockwise direction, as the bearing surfaces 8. Therefore, this sandwich construction is able to be compressed again by exerting a compressive force that exceeds a specific threshold, even when the bearing surfaces 8 and the further bearing surfaces 28 are fixed to one another. Because of the differently oriented sense of rotation of the bearing surfaces of the two spacer structures, this functionality does not exist in the embodiment according to FIG. 21. Should this compressive functionality, which can be adjusted in a controlled manner, not be desired, there is the possibility of rigidly fixing a planar further element to the first spacer structure and to the further spacer structure between the bearing surfaces 8 and the further bearing surfaces 28 in the construction according to FIG. 22. However, this variant is not shown in the figures.

Figure 23:
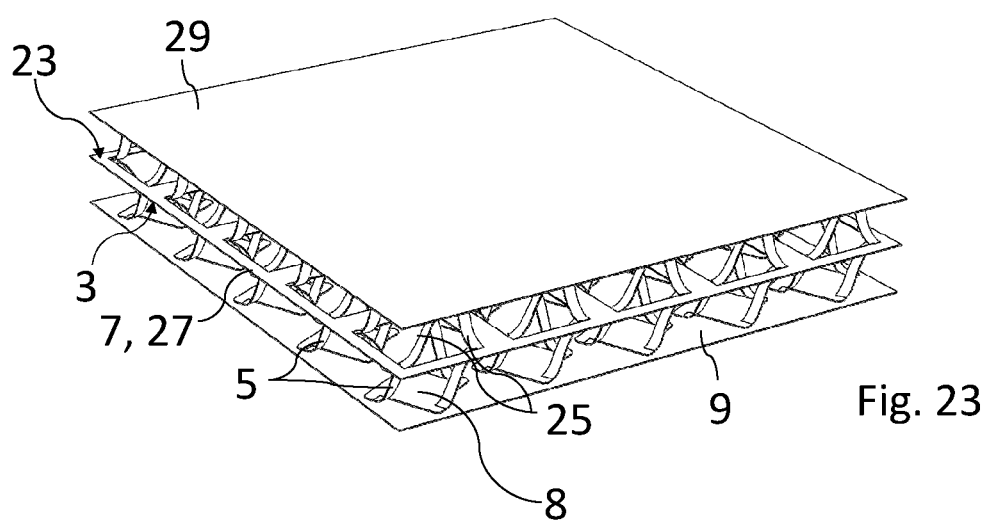
FIG. 23 shows a perspective view of a sandwich construction according to a sixth embodiment.

FIG. 23 shows a perspective view of a sandwich construction according to a sixth embodiment. This sandwich construction corresponds to the sandwich construction shown in FIG. 21, with the difference that the two spacer structures are joined in the center of the sandwich construction on the material webs 3 of the first spacer structure and the further material webs 23 of the further spacer structure, and the bearing surfaces 8, 28 of the two spacer structures are oriented outward from the center of the sandwich construction. The bearing surfaces 8 are connected to a covering element 9, and the further bearing surfaces 28, which are obscured in this illustration, are connected to a further covering element 29.

Figure 24:
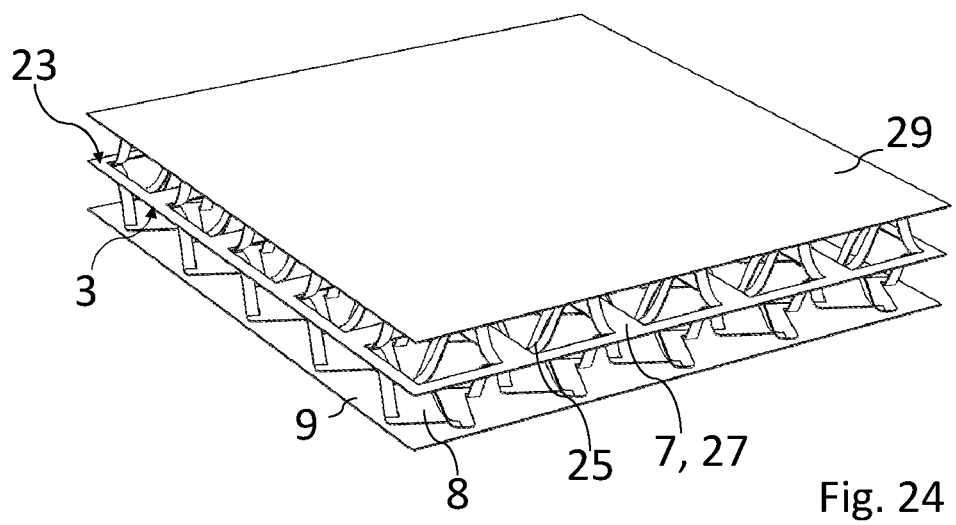
FIG. 24 shows a perspective view of a sandwich construction according to a seventh embodiment.

FIG. 24 shows a perspective view of a sandwich construction according to a seventh embodiment. The sandwich construction shown in FIG. 24 corresponds to the sandwich construction shown in FIG. 23, with the difference that the bearing surfaces 8 have a sense of rotation that is counter to that of FIG. 23.

Figure 25:
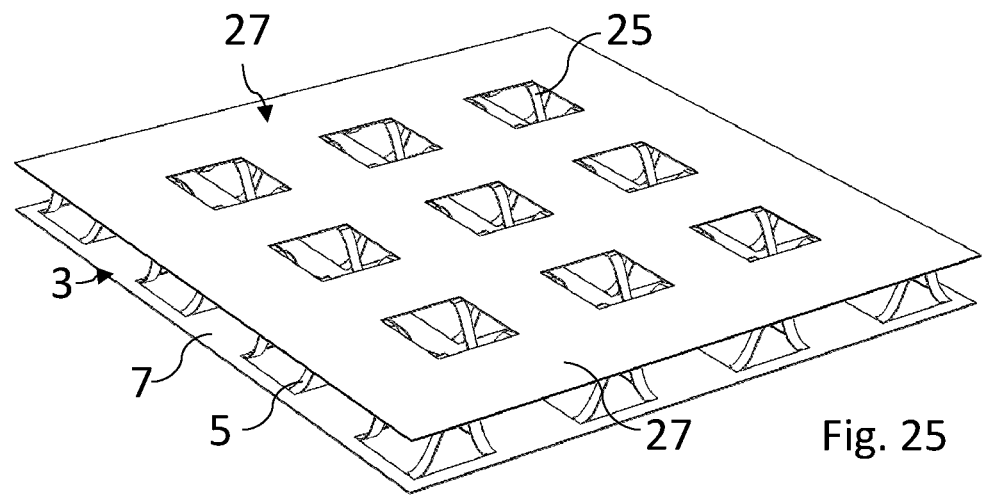
FIG. 25 shows a perspective view of a sandwich construction according to an eighth embodiment.

FIG. 25 shows a perspective view of a sandwich construction according to an eighth embodiment. The embodiment shown in FIG. 25 is composed of a first lower spacer structure and a further upper spacer structure which are nested. The bearing surfaces 8 of the first spacer structure, when viewed per se, are configured like the spacer structure shown in FIG. 19, with the difference that the density of the bearing surfaces 8 is lower in the first plane 7 and a larger spacing thus prevails between the bearing surfaces 8. This can be seen in FIG. 26 which shows the sandwich construction from FIG. 25 in an exploded illustration. As a result of the nested structure of the mutually engaging spacer structures, the bearing surfaces 8 of the first spacer structure come to lie on the further first plane 27 of the further spacer structure, said bearing surfaces 8 being fixed on the latter. Accordingly, the further bearing surfaces 28 of the further spacer structure, which are obscured here and therefore not visible, come to lie on the first plane 7, said further bearing surfaces 28 being fixed thereon. This structure in this instance is present as a very compact and at the same time robust sandwich construction.

Figure 27:
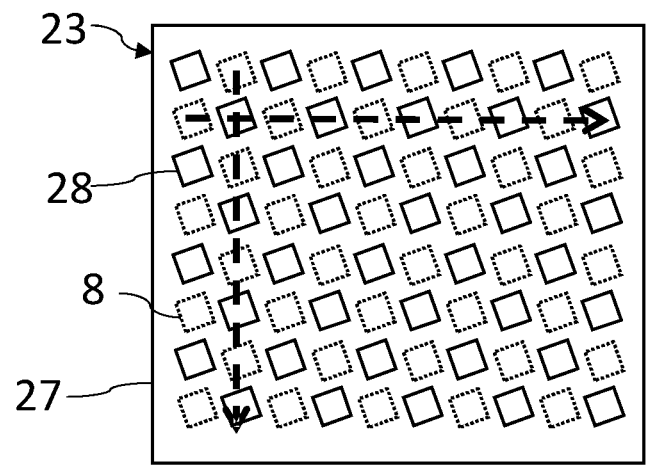
FIG. 27 shows a plan view from above of a sandwich construction according to a ninth embodiment.
Figure 28:
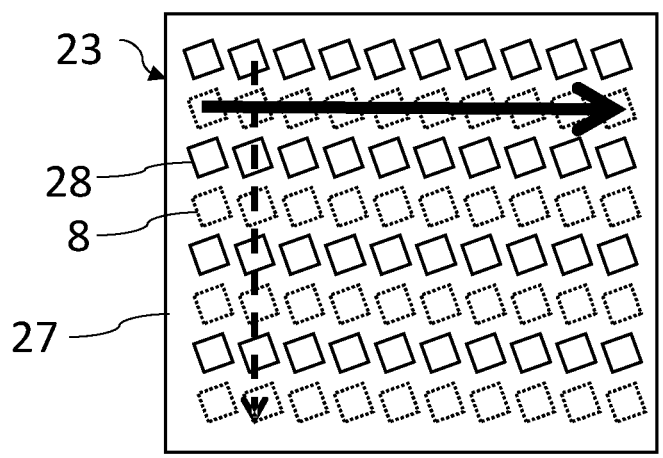
FIG. 28 shows a plan view from above of a sandwich construction according to a tenth embodiment.
Figure 29:
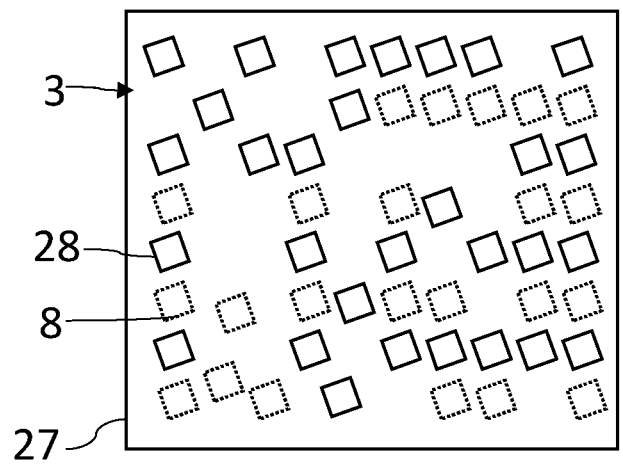
FIG. 29 shows a plan view from above of a sandwich construction according to an eleventh embodiment.

FIGS. 27 to 29 show schematic plan views from above of sandwich constructions according to further embodiments, all of which being constructed from two spacer structures having nested bearing surfaces. The bearing surfaces 8 of the first spacer structure are shown in dashed lines, while the further bearing surfaces 28 of the further spacer structure are drawn using solid lines. When viewed in the plan view from above, a multiplicity of possibilities can be derived for the disposal of the bearing surfaces 8, 28 on the face, some of said possibilities being shown by way of example in FIGS. 27 to 29.

According to FIG. 27, the disposal of the bearing surfaces 8 and of the further bearing surfaces 28 is present in alternating rows such that said bearing surfaces 8, 28 are disposed in a checkerboard pattern. The material web of the first plane (not shown) and the material web 23 that lies in the further first plane 27 form straps which are always interrupted in an alternating manner by the holes, as is highlighted by the dashed arrows.

The advantage of a sandwich construction having nested spacer structures lies in that this sandwich construction with two spacer structures is of a structurally symmetrical construction, and both cover layers of the sandwich construction have the same stability. In the case of the checkerboard pattern, the sandwich construction is equally flexurally stiff in both directions of extent.

According to FIG. 28, the bearing surface 8 and the further bearing surfaces 28 are disposed in the manner of stripes, i.e. in a direction of extent of the sandwich construction, adjacent rows start with bearing surfaces of the same material web. In the case of the stripe-shaped arrangement, wide material webs in the form of straps are created between the depressions that are formed by the formed material web or the further material web 23. This is highlighted by the solid arrow. At that location, wide material webs in the form of straps which can readily absorb tensile and compressive forces are created between the openings of the spacer structures. In the case of this stripe-shaped arrangement, the sandwich construction in the direction of the straps is much more flexurally stiff than in the direction that is always interrupted in an alternating manner by the openings, as is highlighted by the dashed arrow.

According to FIG. 29, the bearing surfaces 8 and the further bearing surfaces 28 are disposed so as not to be periodic and in a non-uniform manner. This may be predefined by the respective requirements of the larger structure in which the sandwich construction is installed.

Figure 26:
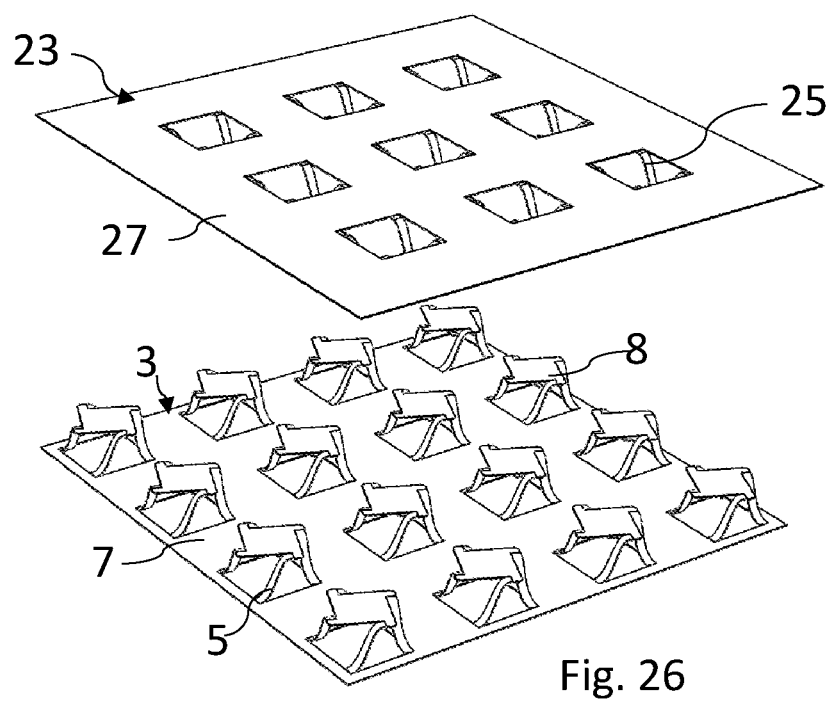
FIG. 26 shows an exploded illustration of the sandwich construction shown in FIG. 25.
Figure 30:
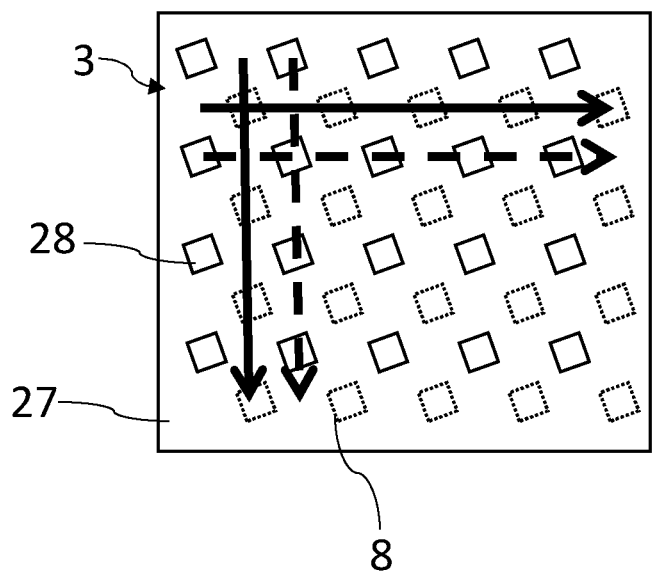
FIG. 30 shows a plan view from above of a sandwich construction according to a twelfth embodiment.

The sandwich construction according to FIG. 30 is configured having a different number and density of bearing surfaces 8 and further bearing surfaces 28. If the number of bearing surfaces 8 and of further bearing surfaces 28 per unit area is reduced, i.e. the spacing between adjacent structures enlarged, as is shown in FIGS. 25 and 26 in comparison to FIG. 22, stripes are created in the first plane 7 and the further first plane 27, said stripes being formed from continuous material webs in the form of straps in both directions of extent of the sandwich construction of planar extent. These stripes are not interrupted by openings. This renders the first plane 7 and the further plane 27 of the sandwich construction particularly stable in tensile and compressive terms. The straps of the first plane 7 and of the further plane 27 are laterally mutually offset, wherein the solid arrows highlight the straps of the material web 3 that have been formed from the material web of the spacer structure, and the dashed arrows show the straps that are formed from the further material web 23 of the further spacer structure.

LIST OF REFERENCE SIGNS

α Twisting angle
γ Cutting angle
E Direction of extent
1 Cut
2 First leg
3 Material web
4 Second leg
5 Spacing element
7 First plane
8 Bearing surface
9 Covering element
10 Third leg
11 Drill hole
12 Bead
13 Roll, coil
14 Joint
15 Roller
16 Further roller
17 Machining station
18 Second plane
23 Further material web
25 Further spacing element
27 Further first plane
28 Further bearing surface
29 Further covering element

The invention claimed is:

1. A spacer structure for a sandwich construction, comprising:
a material web which is provided with a plurality of cuts and has a material web plane as a first plane, wherein a plurality of bearing surfaces, which are spaced apart from the first plane and are disposed in a second plane, are formed in portions by a forming process of the material web, wherein spacing elements in a transition region between the first plane to the second plane run in each case along a direction of extent from the first plane into the second plane, the spacing elements thus spacing apart the first plane from the bearing surfaces, wherein:
by the forming process of the material web, which is carried out by bending the bearing surfaces out of the first plane, the bearing surfaces are twisted in relation to the first plane, on the one hand, and the spacing elements are distorted due to twisting about the direction of extent, on the other hand.

2. The spacer structure for a sandwich construction as claimed in claim 1, wherein the bearing surfaces that are bent out of the material web in the plan view from above of the first plane have a twist of >5° in relation to the first plane.

3. The spacer structure for a sandwich construction as claimed in claim 1, wherein each of the bearing surfaces has a surface circumference, and the spacing elements are uniformly distributed along the surface circumference such that the spacing elements are substantially equidistantly spaced.

4. The spacer structure for a sandwich construction as claimed in claim 3, wherein each of the surface circumferences is defined as a 360° circumference with pairs of adjacent spacing members on the surface circumference, the spacing members of each pair of spacing members separated by a circumferential spacing arc to define a plurality of circumferential spacing arcs defined in degrees, each of the circumferential spacing arcs varying by less than 10 degrees from one another.

5. The spacer structure for a sandwich construction as claimed in claim 3, wherein each of the surface circumferences is defined as a 360° circumference with pairs of adjacent spacing members on the surface circumference, the spacing members of each pair of spacing members separated by a circumferential spacing arc to define a plurality of circumferential spacing arcs defined in degrees, each of the circumferential spacing arcs varying by less than 5 degrees from one another.

6. The spacer structure for a sandwich construction as claimed in claim 1 wherein each cut has a first leg and a second leg, wherein the first leg transitions to the second leg, and a cutting angle is enclosed between a direction of extent of the first leg and a direction of extent of the second leg, wherein the cuts are in each case disposed about one bearing surface.

7. The spacer structure for a sandwich construction as claimed in claim 6, wherein the cutting angle is in a range from 40 to 140 degrees.

8. The spacer structure for a sandwich construction as claimed in claim 6, wherein the first leg is configured as a long first leg, as opposed to the second leg which is configured as a short second leg.

9. The spacer structure for a sandwich construction as claimed in claim 8, wherein the cuts, when viewed from the long first leg toward the short second leg, have an identical sense of rotation which is oriented in a clockwise direction or in a counterclockwise direction.

10. The spacer structure for a sandwich construction as claimed in claim 8, wherein in the material web the short second leg of an adjacent cut is disposed between the one long first leg of a cut and the bearing surface, wherein the spacing elements are configured between the long first legs and adjacent short second legs.

11. The spacer structure for a sandwich construction as claimed in claim 6, wherein the cutting angle is in a range from 60 to 120 degrees.

12. A sandwich construction, having a spacer structure as claimed in claim 1, and a covering element which is fastened to the bearing surfaces.

13. The sandwich construction as claimed in claim 12, wherein the covering element is configured as a flat face or as a face with one or a plurality of curvatures, wherein the spacer structure comprises a multiplicity of bearing surfaces of identical or dissimilar configurations.

14. The spacer structure for a sandwich construction as claimed in claim 1, wherein the bearing surfaces that are bent out of the material web in the plan view from above of the first plane have a twist of >10° in relation to the first plane.

15. The spacer structure for a sandwich construction as claimed in claim 1, wherein the bearing surfaces that are bent out of the material web in the plan view from above of the first plane have a twist of >30° in relation to the first plane.

16. A method for producing the spacer structure as claimed in claim 1, said method comprising the following steps:

providing the material web that configures the first plane;
producing cuts having a first leg and a second leg, which adjoin the first leg, in the material web, wherein the cuts are disposed in such a manner that a multiplicity of bearing surfaces, are enclosed by the cuts, and wherein, each first leg of a cut is parallel to, or forms an acute angle with, a second leg of another cut such that, as a result, spacing elements which run between the bearing surfaces and the surrounding first plane of the material web are configured in the material web,
bending the material web in a region of the bearing surfaces in such a manner that the bearing surfaces are spaced apart from the first plane and twisted in relation to the first plane, on the one hand, and the spacing elements are distorted about a direction of extent thereof by the bending, on the other hand.

17. The method as claimed in claim 16, wherein the first leg of the cuts is configured as a long first leg, as opposed to the second leg which is configured as short second leg, and the cuts are incorporated into the material web in such a manner that said cuts, when viewed from the long first leg toward the short second leg, have an identical rotation direction which is oriented in a clockwise direction or a counterclockwise direction.

18. The method as claimed in claim 16, wherein the incorporating of cuts into the material web is performed by blade cutting, laser cutting, waterjet cutting or punching.

19. The method as claimed in claim 11, wherein, following the bending of the material web, a deep drawing step and/or a bending step are/is carried out so as to change a spatial position of each bearing surface of the multiplicity of bearing surfaces.

20. The method as claimed in claim 16, wherein said method is carried out as an in-line method by a rotary die cutter and a downstream lateral buckling device.

* * * * *